US 8,583,630 B2

(12) United States Patent
Schultz et al.

(10) Patent No.: US 8,583,630 B2
(45) Date of Patent: Nov. 12, 2013

(54) MULTIMEDIA PORTAL

(75) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 112 days.

(21) Appl. No.: 13/240,522

(22) Filed: Sep. 22, 2011

(65) Prior Publication Data
US 2012/0011215 A1    Jan. 12, 2012

Related U.S. Application Data

(63) Continuation of application No. 11/961,194, filed on Dec. 20, 2007, now Pat. No. 8,046,356.

(51) Int. Cl.
*G06F 7/14* (2006.01)
*G06F 17/30* (2006.01)

(52) U.S. Cl.
USPC ............ 707/722; 707/758; 707/827; 707/705

(58) Field of Classification Search
None
See application file for complete search history.

(56) References Cited

U.S. PATENT DOCUMENTS

| | | |
|---|---|---|
| 6,784,899 B1 | 8/2004 | Barrus et al. |
| 2006/0291630 A1 | 12/2006 | Benco et al. |
| 2007/0198534 A1 | 8/2007 | Hon et al. |
| 2008/0015932 A1 | 1/2008 | Haeuser et al. |
| 2008/0021957 A1 | 1/2008 | Medved et al. |
| 2008/0162400 A1 | 7/2008 | O'Malley |

*Primary Examiner* — Bruce Moser

(57) ABSTRACT

A system receives, from a first user, a communication request for a second user and determines, in response to receiving the communication request, whether a trigger is satisfied. The system may aggregate, in response to determining that the trigger is satisfied, content of different types to form multimedia content and provide the multimedia content to the first user.

20 Claims, 25 Drawing Sheets

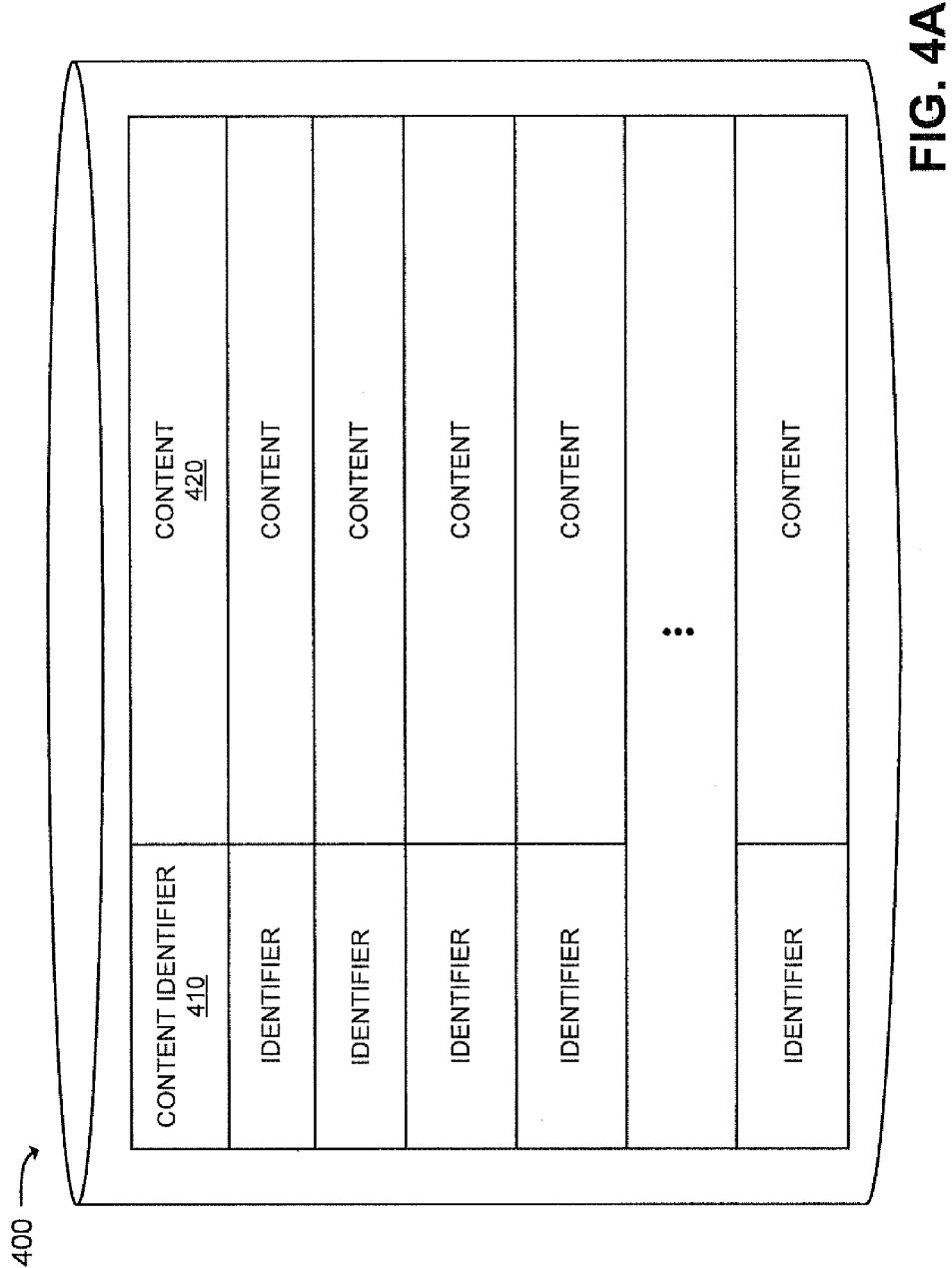

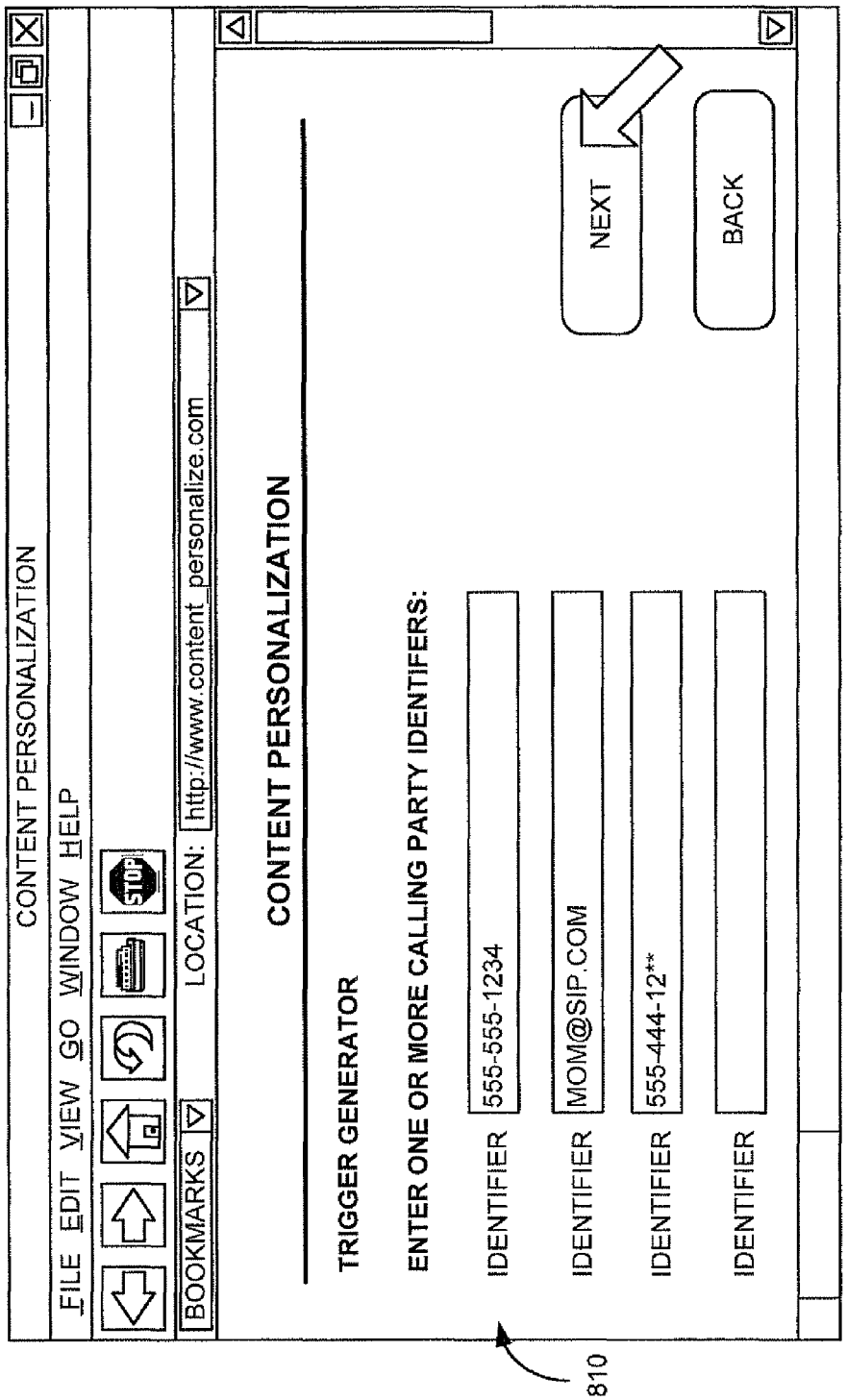

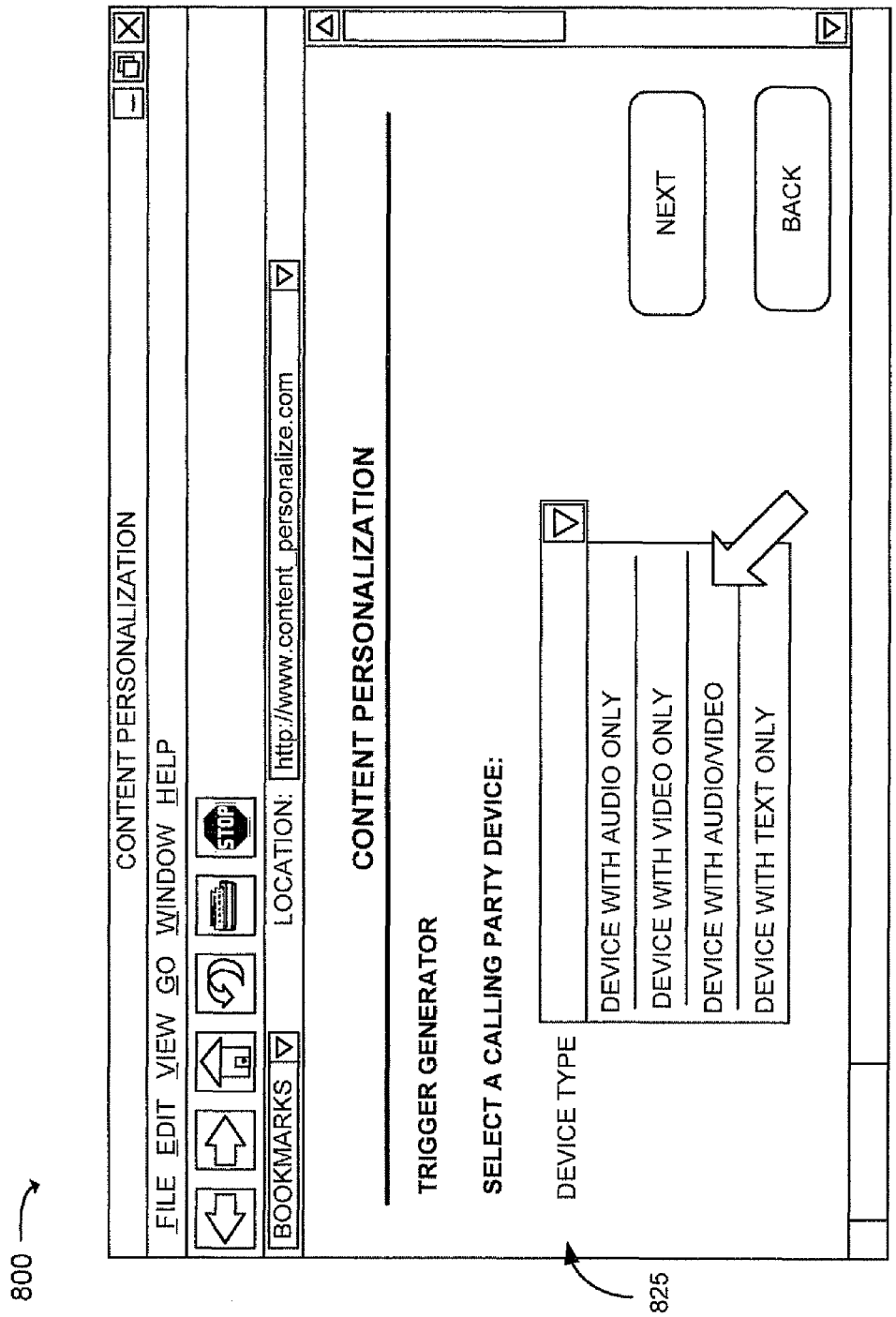

US 8,583,630 B2

MULTIMEDIA PORTAL

RELATED APPLICATION

This application is a continuation of U.S. patent application Ser. No. 11/961,194, filed Dec. 20, 2007, the disclosure of which is incorporated by reference herein in its entirety.

BACKGROUND INFORMATION

A user may cause an audible greeting to be provided as an introduction to the user's voicemail system. In some instances, the user may cause different audible greetings to be provided to different calling parties based on identifiers associated with the calling parties.

BRIEF DESCRIPTION OF THE DRAWINGS

FIGS. 4A-4B are exemplary diagrams of portions of databases that may be associated with the multimedia portal of FIG. 1;

FIGS. 8A-8G are exemplary graphical user interfaces that may allow a user to define a trigger according to an exemplary embodiment;

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Embodiments described herein are directed to a multimedia portal that allows users to generate content, aggregate content of the same or different media (possibly in real time), and deliver the aggregated content in accordance with a user's instructions. In one embodiment, the multimedia portal may generate multimedia (e.g., text, audio, video, etc.) content that is associated or linked together in a structure or hierarchical format. The multimedia portal may also aggregate (possibly in real time) different multimedia content, based on a user's criteria. The multimedia portal may provide resulting multimedia content in a variety of applications.

A "multimedia portal," as broadly described herein may include one or more components located on a user's device and/or one or more components located on one or more network devices, such as a server. Thus, a "multimedia portal" may include components located on a single device or on multiple (possibly remote) devices. For explanatory purposes, the multimedia portal will be described as being located on a network device, such as a server.

Figure 1:
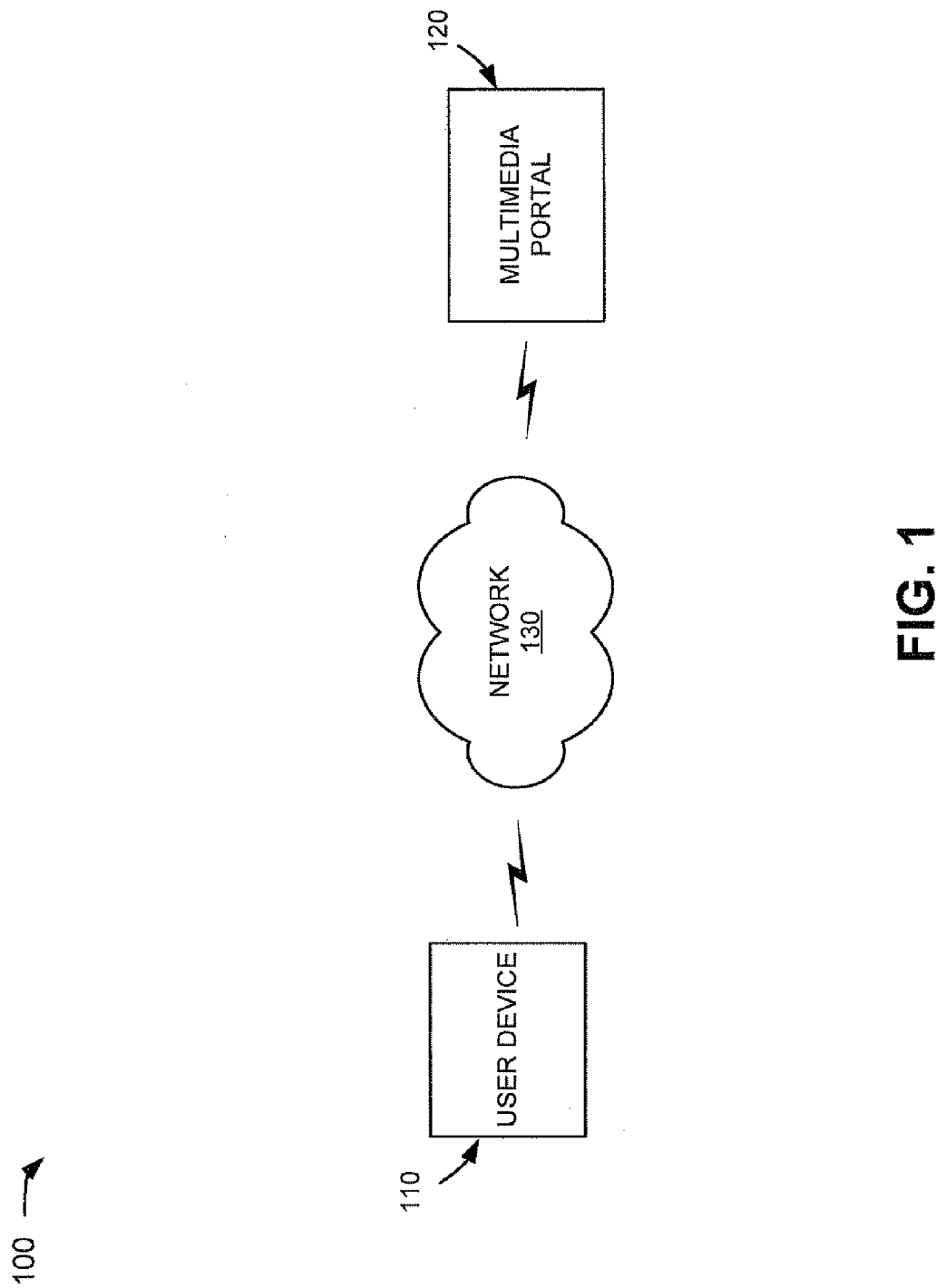
FIG. 1 is an exemplary network in which systems and methods, consistent with exemplary embodiments, may be implemented.

FIG. 1 is an exemplary network 100 in which systems and methods, consistent with exemplary embodiments, may be implemented. As illustrated, network 100 may include a user device 110, a multimedia portal 120, and a network 130. The number of user devices 110, multimedia portals 120, and networks 130 illustrated in FIG. 1 is provided for simplicity. In practice, there may be more user devices 110, multimedia portals 120, and/or networks 130.

User device 110 may include a client entity. An entity may be defined as a device, such as a computer or another type of computation or communication device, a thread or process running on one of these devices, and/or an object executable by one of these devices. In one embodiment, user device 110 may include a personal computer, a laptop, a wireless device (e.g., a cellular telephone, a personal digital assistant (PDA), etc.), a telephone device (such as a Plain Old Telephone System (POTS) telephone, a Session Initiation Protocol (SIP) telephone, etc.), a set-top box that provides network access, an Internet Protocol (IP) Multimedia Subsystem (IMS) client, and/or any other type of device that may interact with another device, such as multimedia portal 120. User device 110 may connect to network 130 via wired and/or wireless connections.

Multimedia portal 120 may include a server entity. As indicated above, an entity may be defined as a device, such as a computer or another type of computation or communication device, a thread or process running on one of these devices, and/or an object executable by one of these devices. In one embodiment, server 130 may receive content and/or information identifying content and may generate content (possibly in real time) based on triggers specified by a user, such as a user of user device 110, and provide the generated content to users based on specified communication handling procedures specified by the user. Multimedia portal 120 may connect to network 130 via wired and/or wireless connections.

Network 130 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an IMS network, a private network, the Internet, an intranet, and/or another type of network.

One or more components of network 100 may perform one or more of the tasks described as being performed by one or more other components of network 100.

Figure 2:
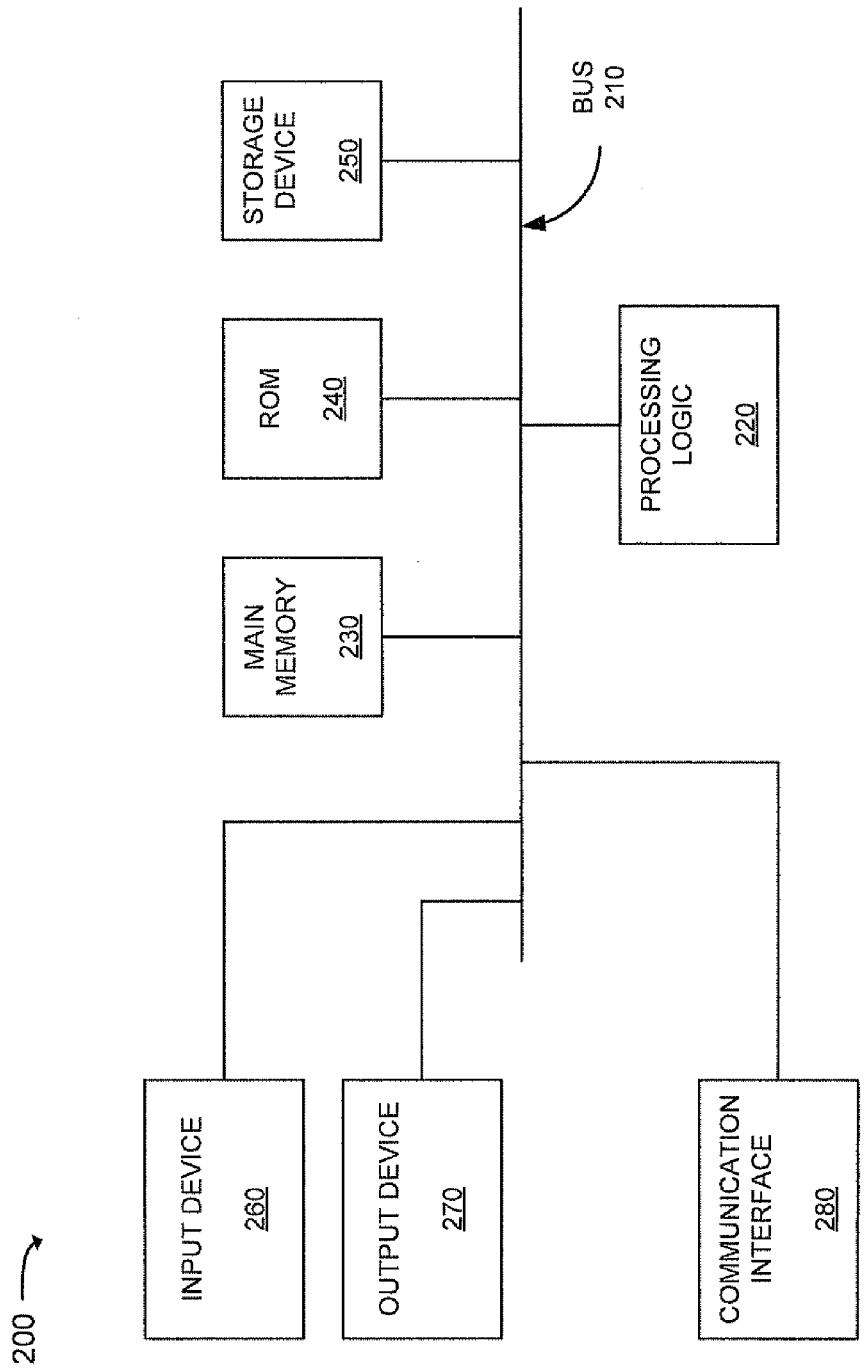
FIG. 2 is an exemplary block diagram of a device consistent with exemplary embodiments.

FIG. 2 is an exemplary block diagram of a device 200 in one embodiment. Device 200 may correspond to user device 110 and/or multimedia portal 120. As illustrated, device 200 may include a bus 210, processing logic 220, a main memory 230, a read only memory (ROM) 240, a storage device 250, an input device 260, an output device 270, and/or a communication interface 280. In one embodiment, device 200 may include fewer, additional, or different components than those illustrated in FIG. 2.

Bus 210 may include a path that permits communication among the components of device 200. Processing logic 220 may include a processor, a microprocessor, or other types of processing logic, such as an application specific integrated circuit (ASIC), a field programmable gate array (FPGA), etc., that may interpret and execute instructions. Main memory 230 may include a random access memory (RAM) or another type of dynamic storage device that may store information and instructions for execution by processing logic 220. ROM 240 may include a ROM device or another type of static storage device that may store static information and instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, a camera, an audio/video recorder, etc. Output device 270 may include a mechanism that outputs information to the operator, including a display, a printer, a speaker, etc. Communication interface 280 may include any transceiver-like mechanism that enables device 200 to communicate with other devices and/or systems via a network, such as network 140.

As will be described in detail below, device 200 may perform certain operations. Device 200 may perform these and other operations in response to processing logic 220 executing software instructions contained in a computer-readable medium, such as main memory 230. A computer-readable medium may be defined as a physical and/or logical memory device or a carrier wave.

The software instructions may be read into main memory 230 from another computer-readable medium, such as storage device 250, or from another device via communication interface 280. The software instructions contained in main memory 230 may cause processing logic 220 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 3:
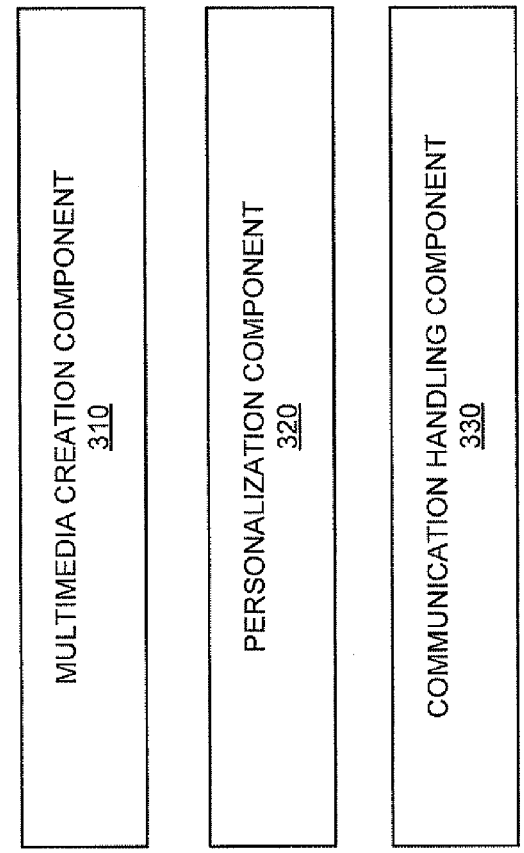
FIG. 3 is an exemplary functional diagram of a portion of the multimedia portal of FIG. 1.

FIG. 3 is an exemplary functional diagram of a portion of multimedia portal 120 according to an exemplary embodiment. As illustrated, multimedia portal 120 may include a multimedia creation component 310, a personalization component 320, and a communication handling component 330. In other embodiments, multimedia portal 120 may include fewer, additional, or different components than illustrated in FIG. 3. Moreover, one or more of the components illustrated in FIG. 3 may additionally and/or alternatively be implemented within another device, such as user device 110.

Multimedia creation component 310 may include one or more components that allow a user to create and store multimedia content to be provided for an application (such as for processing an incoming communication, as a ringback, etc.). In one embodiment, multimedia creation component 310 may allow a user to combine different types of content (e.g., audio files, image files, video files, text files, and/or other types of files, content from one or more external sources, such as content from a web page, etc.) to create multimedia content. The content may include static content or dynamic content. For example, a user may cause a current weather report, sports scores, stock tickers, etc. to be captured by multimedia creation component 310 from a network device and possibly combined with audio, image, video, data, and/or other types of files. In some embodiments, a user may upload content to multimedia creation component 310 or purchase content from multimedia portal 120 and/or from another source. Multimedia creation component 310 may allow the user to manipulate multimedia content in a variety of ways to create a final content product. For example, the user may overlay first content on second content, move a location of first content in relation to second content, provide special effects in relation to first content, change a playback volume of first content and/or second content, etc.

Personalization component 320 may include one or more components that allow a user to create triggers that define when particular content is to be provided to particular users. The triggers may be based on one more static and/or dynamic factors. For example, a user may define a trigger based on an identifier associated with an origination user (a user initiating a communication) (e.g., a name), an identifier associated with an origination device (e.g., an address associated with the origination device, such as a telephone number, a URI, an IP address, etc.), time of day, day of year, a number of times a particular origination user sends a communication to the user, the capabilities of an origination device, one or more external factors (e.g., a factor relating to a current weather condition, a factor relating to a stock, a group of stocks, the stock market, etc., a factor relating to a sports team or group of sports teams, and/or other types of factors), a priority code (or other type of input) that is provided by an origination user, etc. Moreover, personalization component 320 may include one or more components that allow a user to associate content with created triggers and create communication handling procedures that define how a particular communication is to be handled (e.g., whether a communication establishment request should be routed to the intended destination, voicemail, videomail, forwarded to a particular destination device 120, etc.).

Communication handling component 330 may receive a communication from an origination device (e.g., a telephone device, a video conferencing device, a computer device, etc.), determine whether the received communication satisfies a trigger, and, when the received communication satisfies a trigger, obtain associated content and provide the content in accordance with the communication handling procedure associated with the trigger. Communication handling procedure 330 may also determine whether a trigger has been satisfied based on other criteria (i.e., in addition to or as an alternative to receiving a communication), such as date/time information, etc. Communication handling component 330 may modify content based on the capabilities of an origination device from which a communication was received. For example, communication handling component 330 may provide some content from identified multimedia content to be provided and not provide other content based on the capabilities of the origination device. Communication handling component 330 may also convert particular content from a first format to a second format (e.g., a data file to an audio file, etc.) based on the capabilities of the origination device.

One or more components of the above portion of multimedia portal 120 may perform one or more of the tasks described as being performed by one or more other components of the above portion of multimedia portal 120.

FIG. 4A is an exemplary diagram of a portion of a first database 400 that may be associated with multimedia portal 120. In addition or alternatively, database 400 may be associated with another device, such as user device 110. While one database is described below, it will be appreciated that database 400 may include multiple databases stored locally at multimedia portal 120 (and/or user device 110), or stored at one or more different and possibly remote locations.

As illustrated, database 400 may maintain a group of entries in the following exemplary fields: a content identifier field 410 and a content field 420. Database 400 may maintain additional or different information than that illustrated in FIG. 4A.

Content identifier field 410 may store a sequence of characters that identifies content that a user has created (e.g., via user device 110). The sequence of characters may be automatically generated or supplied by the user.

Content field 420 may store content or one or more links to content that is associated with the identifier in content identifier field 410. The content may include static content and/or dynamic content. The static content may include, for example, one or more stored image files, audio files, video files, text files, etc. The dynamic content may include, for example, content that is dynamically captured from one or more external sources, such as web sites and Really Simple Syndication (RSS) feeds. The dynamically captured content may include, for example, a current weather report captured from a web site that provides weather reports, a current stock or stock market report from a web site that provides stock reports, a sports score from a web site that provides sports scores, and/or any other type of dynamic content. Additionally or alternatively, the dynamic content may include dynamic selection of static content. For example, the content in content field 420 may include static content (e.g., one or more image files, audio files, video files, text files, etc.) that is randomly selected from a location (e.g., main memory 230 and/or storage device 250) within multimedia portal 120 or external from multimedia portal 120.

In one embodiment, content field 420 may additionally store content information indicating how the dynamic content is to be dynamically combined to render a final content product. For example, the content information in content field 420 may identify that a current weather report is to be provided as a background image and if a specified college football team is winning or has won their football game, that a first image (e.g., an image of the user with a happy look on his/her face) is to be overlaid on the background image. If the specified college football team is losing or has lost their football game, the content information may indicate that a second image (e.g., an image of the user having a disappointed look on his/her face) is to be overlaid on the background image. Thus, the final content product in content field 420 may include static and/or dynamic content which may have been previously combined or which may be combined in a dynamic way.

Figure 4B:
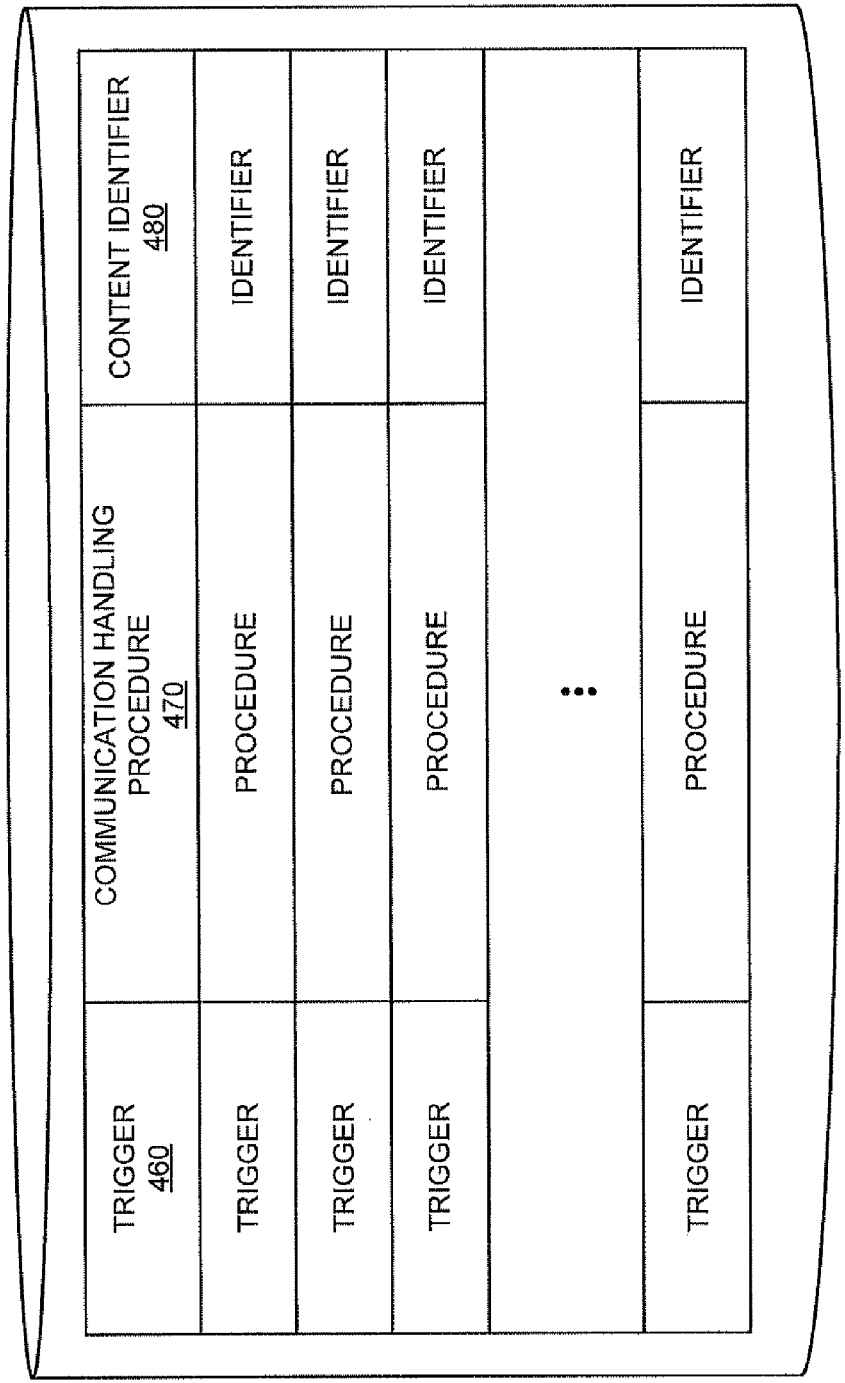

FIG. 4B is an exemplary diagram of a portion of a second database 450 that may be associated with multimedia portal 120. In addition or alternatively, database 450 may be associated with another device, such as user device 110. While one database is described below, it will be appreciated that database 450 may include multiple databases stored locally at multimedia portal 120 (and/or user device 110), or stored at one or more different and possibly remote locations.

As illustrated, database 450 may maintain a group of entries in the following exemplary fields: a trigger field 460, a communication handling procedure field 470, and a content identifier field 480. Database 450 may maintain additional or different information than that illustrated in FIG. 4B.

Trigger field 460 may store information identifying triggers created by a user. The triggers may be based on one more static and/or dynamic factors. For example, a trigger may be based on an identifier associated with an origination user (a user initiating a communication) (e.g., a name), an identifier associated with an origination device (e.g., an address associated with the origination device, such as a telephone number, a URI, an IP address, etc.), time of day, day of year, a number of times a particular origination user sends a communication to the user, the capabilities of an origination device, one or more external factors (e.g., a factor relating to a current weather condition, a factor relating to a stock, a group of stocks, the stock market, etc., a factor relating to a sports team or group of sports teams, and/or other types of factors), a priority code (or other input) that is provided by an origination user, etc.

Communication handling procedure field 470 may store information identifying a communication handling procedure that is to be used when the trigger identified in trigger field 460 is satisfied. The communication handling procedure may indicate how content identified in content identifier field 480 is to be rendered to a user, such as an origination user. Content identifier 480 may store one or more identifiers that correspond to the identifiers in content identifier field 410 (FIG. 4A).

Figure 5:
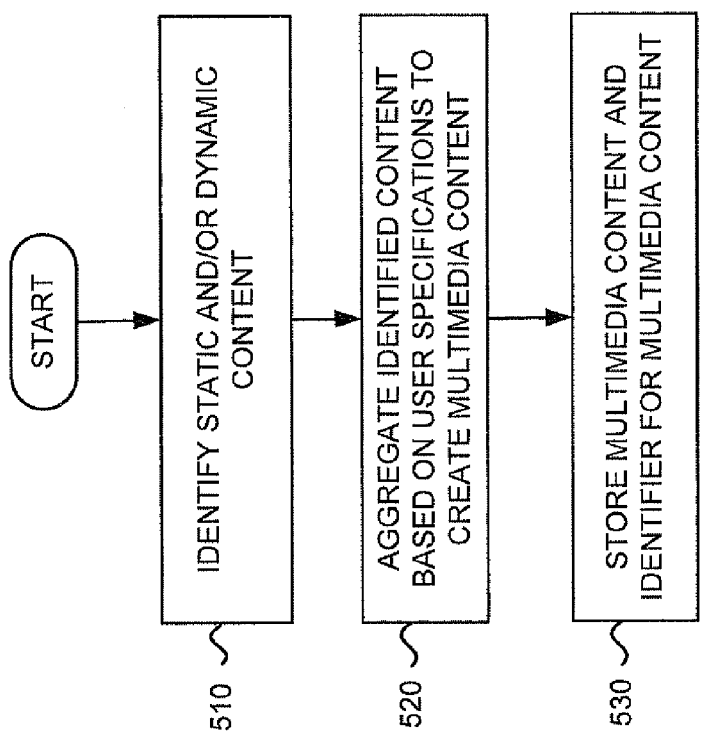
FIG. 5 is a flow chart of an exemplary process for creating content in exemplary embodiments.

FIG. 5 is a flow chart of an exemplary process for creating content in exemplary embodiments. In one embodiment, the exemplary process of FIG. 5 may be performed by multimedia portal 120. In another embodiment, some or all of the exemplary process described below may be performed by another device, such as user device 110, or combination of devices.

The exemplary process may begin with multimedia portal 120 receiving information identifying static and/or dynamic content (block 510). In one embodiment, multimedia portal 120 (e.g., via multimedia creation component 310) may provide a user with one or more graphical user interfaces that allow the user to identify static and/or dynamic content that is to be combined to form a final content product. In some embodiments, a user may upload content to multimedia portal 120, may identify content stored at multimedia portal 120, may identify content to multimedia portal 120 from a pay or free web site, and/or may identify content in other ways.

Multimedia portal 120 may aggregate the identified content based on user specifications to create a final content product (block 520). In one embodiment, multimedia portal 120 (e.g., via multimedia creation component 310) may provide a user with one or more graphical user interfaces that allow the user to combine the identified static and/or dynamic content to form multimedia content. The static and/or dynamic content may include content of the same media type or different media types. For example, multimedia portal 120 may allow the user to combine an image (or video) with audio content, overlay a first image (or video) on a second image, mix one audio file with another audio file, create special effects (e.g., cause an image to fade in and then fade back out), and/or combine content in other ways to create the multimedia content. In some instance, the multimedia content may correspond to the final content product, which may be retrieved and provided to an origination user. In other instances, the multimedia content may include links to various content and instructions as to how that content is to be combined to form the final content product. In these instances, multimedia portal 120 may combine the multimedia content in real time to form the final content product.

Multimedia portal 120 may store the multimedia content (block 530). The multimedia content may include stored content and/or one or more links to dynamic content that is part of the final content product. In one embodiment, multimedia portal 120 may store the multimedia content in a database, such as database 400. Moreover, multimedia portal 120 may associate a content identifier with the stored multimedia content in the database (block 530). The content identifier may be automatically generated (e.g., by multimedia creation component 310) or supplied by the user who created the multimedia content.

Figure 6A:
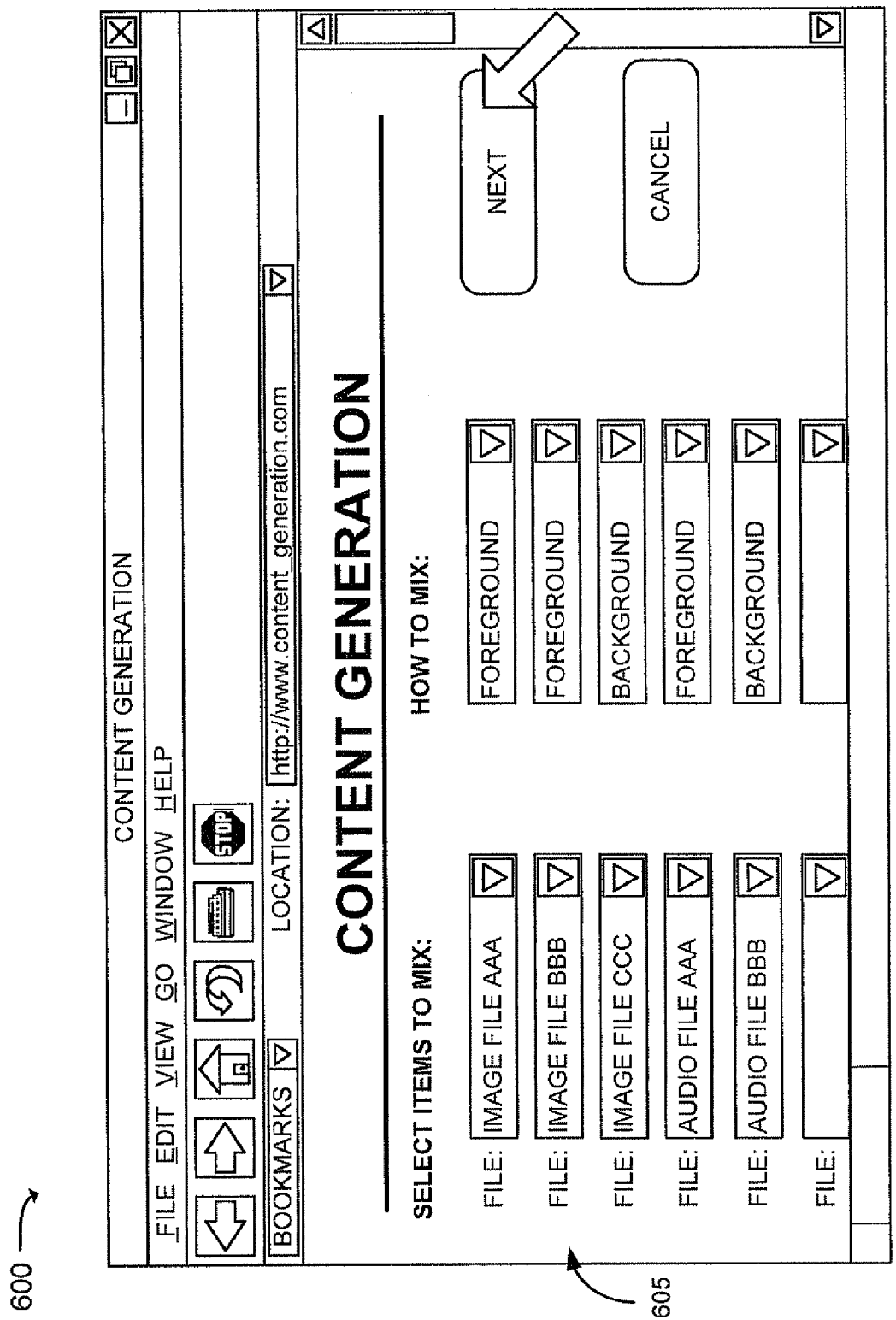
FIGS. 6A-6H are exemplary graphical user interfaces that may allow a user to create content according to an exemplary embodiment.

FIGS. 6A-6H provide an example 600 of the exemplary process described with respect to FIG. 5. Assume that a user has accessed multimedia portal 120 to create multimedia content that is to be provided in relation to one or more applications (e.g., as a ringback). Assume further that multimedia portal 120 has provided a graphical user interface 605 that allows the user to identify content that is to be combined to form the multimedia content, as illustrated in FIG. 6A. In one implementation, graphical user interface 605 may be provided via a web browser-based application. Graphical user interface 605 may allow the user to identify content and how that content is to be aggregated. In example 600, assume that the user has identified image file AAA (which is an image of the user), image file BBB (which is an image of a balloon), image file CCC (which is an image of a forest), audio file AAA (which is a voice message), and audio file BBB (which is an instrumental song). Assume further that the user has indicated that image files AAA and BBB are to be displayed in the foreground and that image file CCC is to be displayed in the background. Assume that the user has also indicated that audio file BBB is to be provided as background audio and audio file AAA is to be provided in the foreground.

Figure 6B:
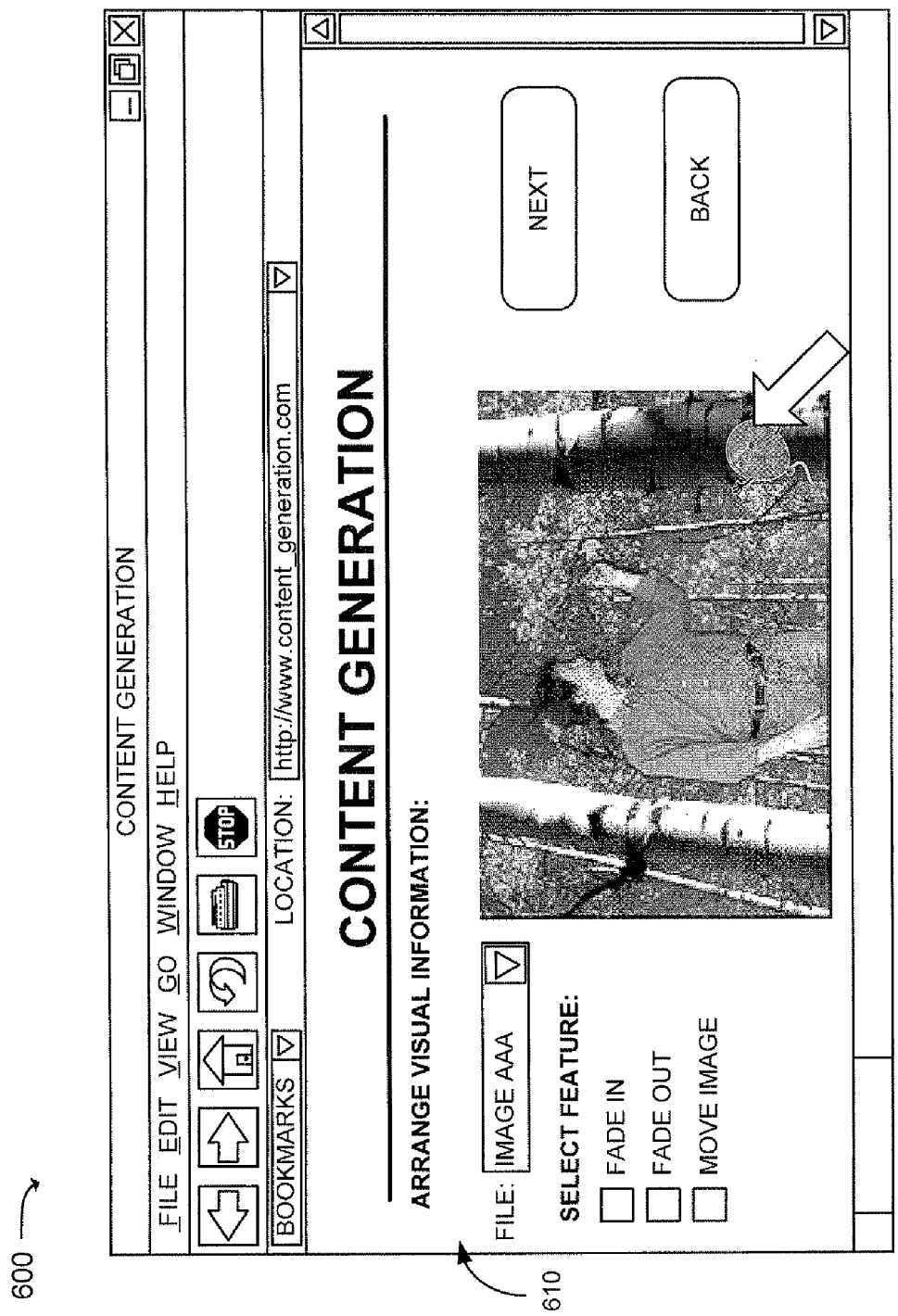

Upon selection of the NEXT button, multimedia portal 120 may provide a number of graphical user interfaces that allow the user to combine the visual information in a desired manner and a number of graphical user interfaces that allow the user to combine the audio information in a desired manner. For example, multimedia portal 120 may provide a graphical user interface 610, as illustrated in FIG. 6B. Graphical user interface 610 may depict images AAA, BBB, and CCC and allow the user to move images AAA and BBB in relation to background image CCC (e.g., to specify a location on image CCC at which images AAA and BBB should be overlaid). Graphical user interface 610 may further allow the user to specify a special effects feature to be associated with an image. For example, graphical user interface 610 may allow the user to fade an image in, fade an image out, cause the image to move (in a specified or random manner), and/or associate other types of special effects.

Figure 6C:
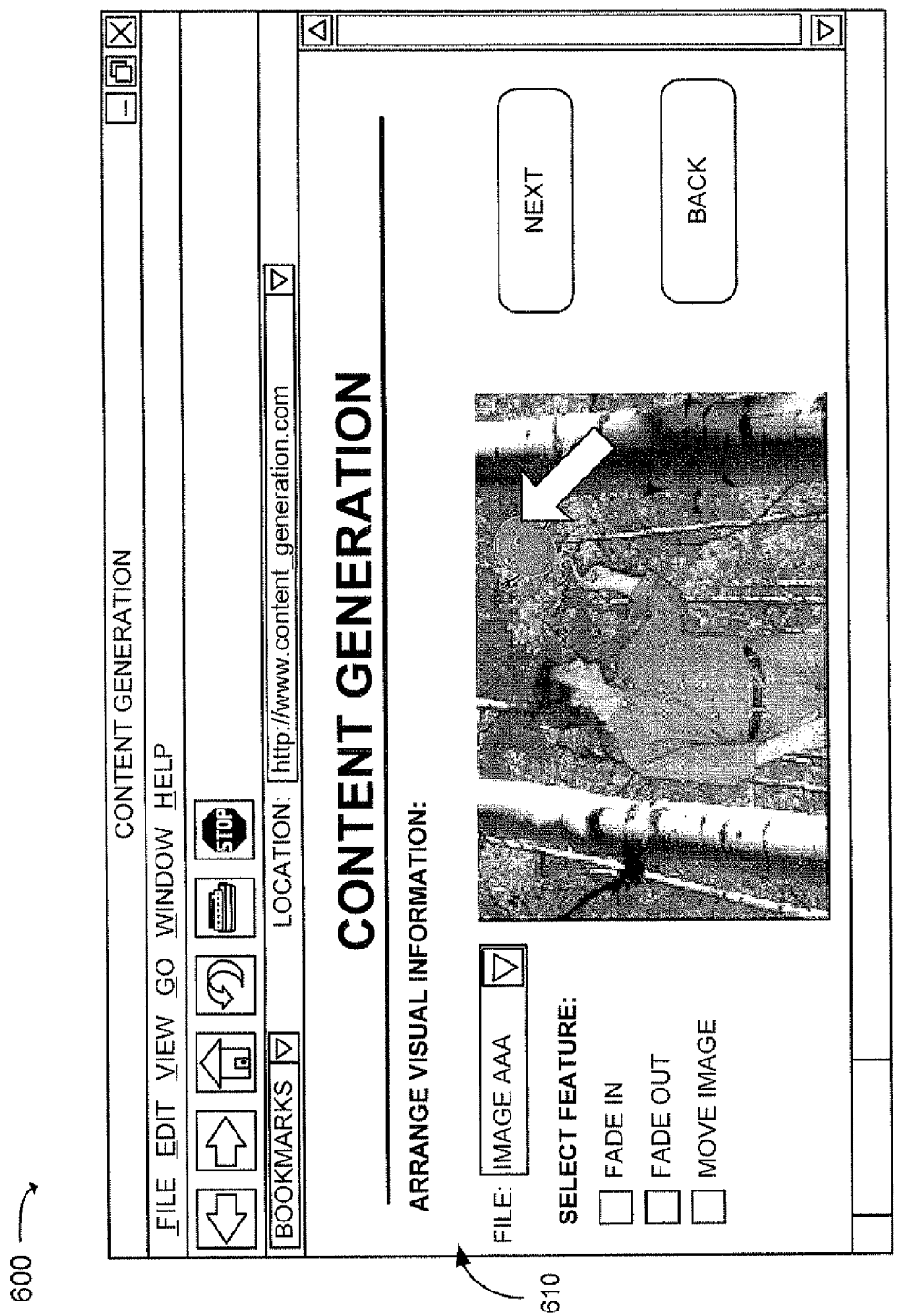
Figure 6D:
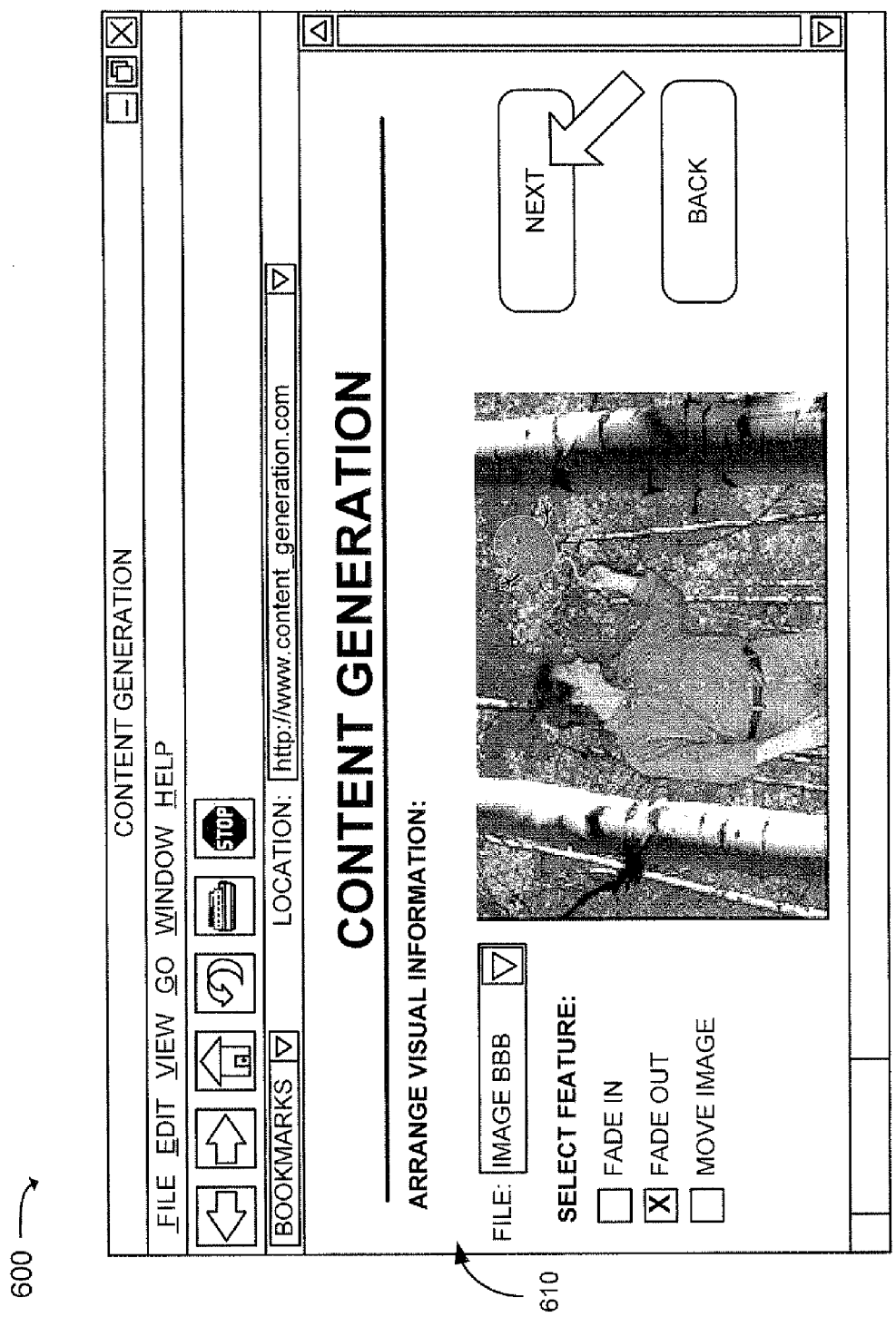
Figure 6E:
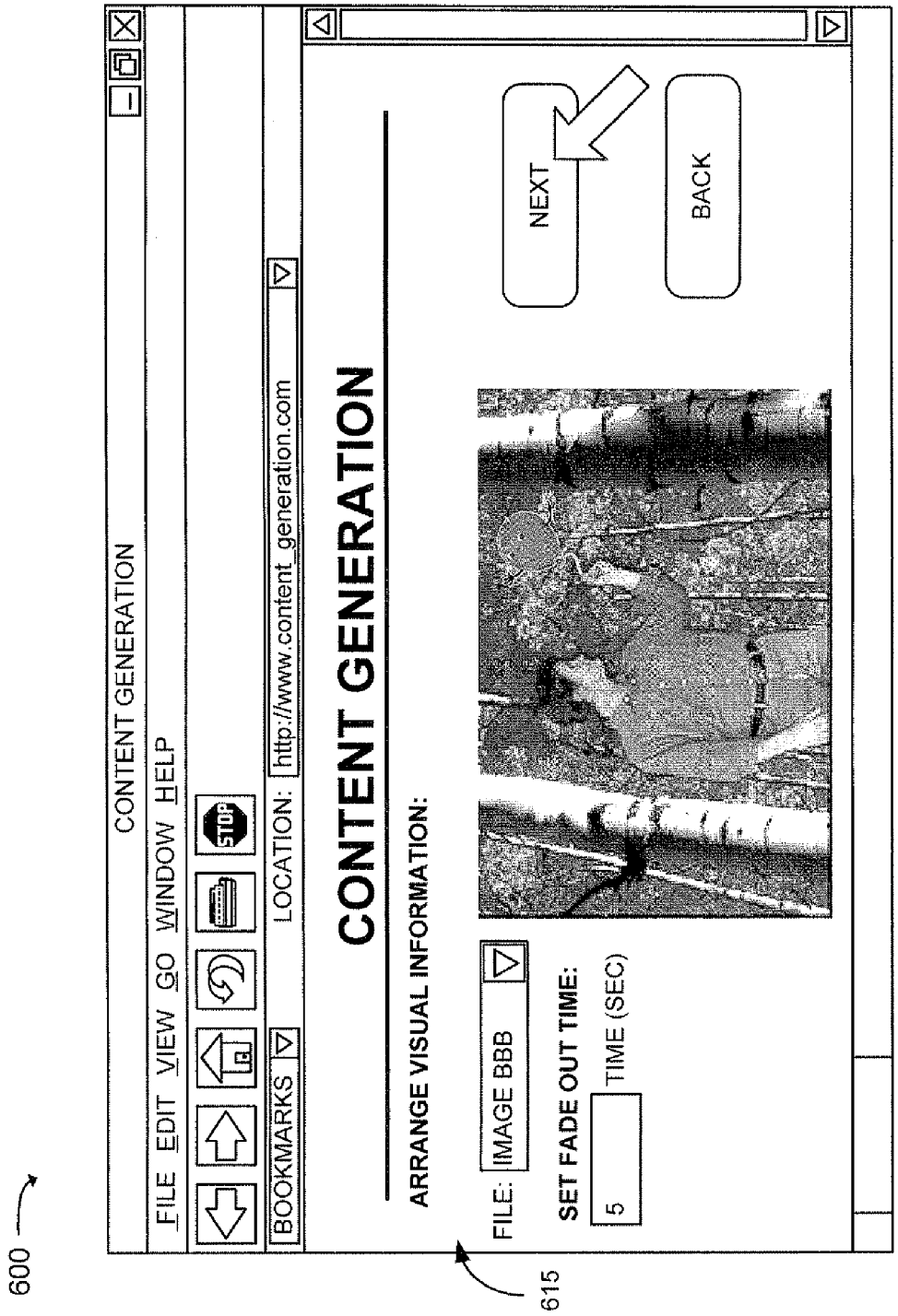

Assume that the user moves image BBB so that the string of the balloon appears in the hand of the user depicted in image AAA. Thus, as illustrated in FIG. 6C, the user may select image BBB (e.g., by clicking on it) and drag image BBB so that the string appears in the hand of the user depicted in image AAA. Assume further that the user desires to cause image BBB to fade out after some period of time. Thus, as illustrated in FIG. 6D, the user may identify image BBB as the file and select the fade out option (e.g., by selecting the appropriate box). By selecting the NEXT button, multimedia portal 120 may provide a graphical user interface 615 that allows the user to determine when image BBB should be faded out. Thus, as illustrated in FIG. 6E, the user may indicate that image BBB is to be faded out after 5 seconds.

Figure 6F:
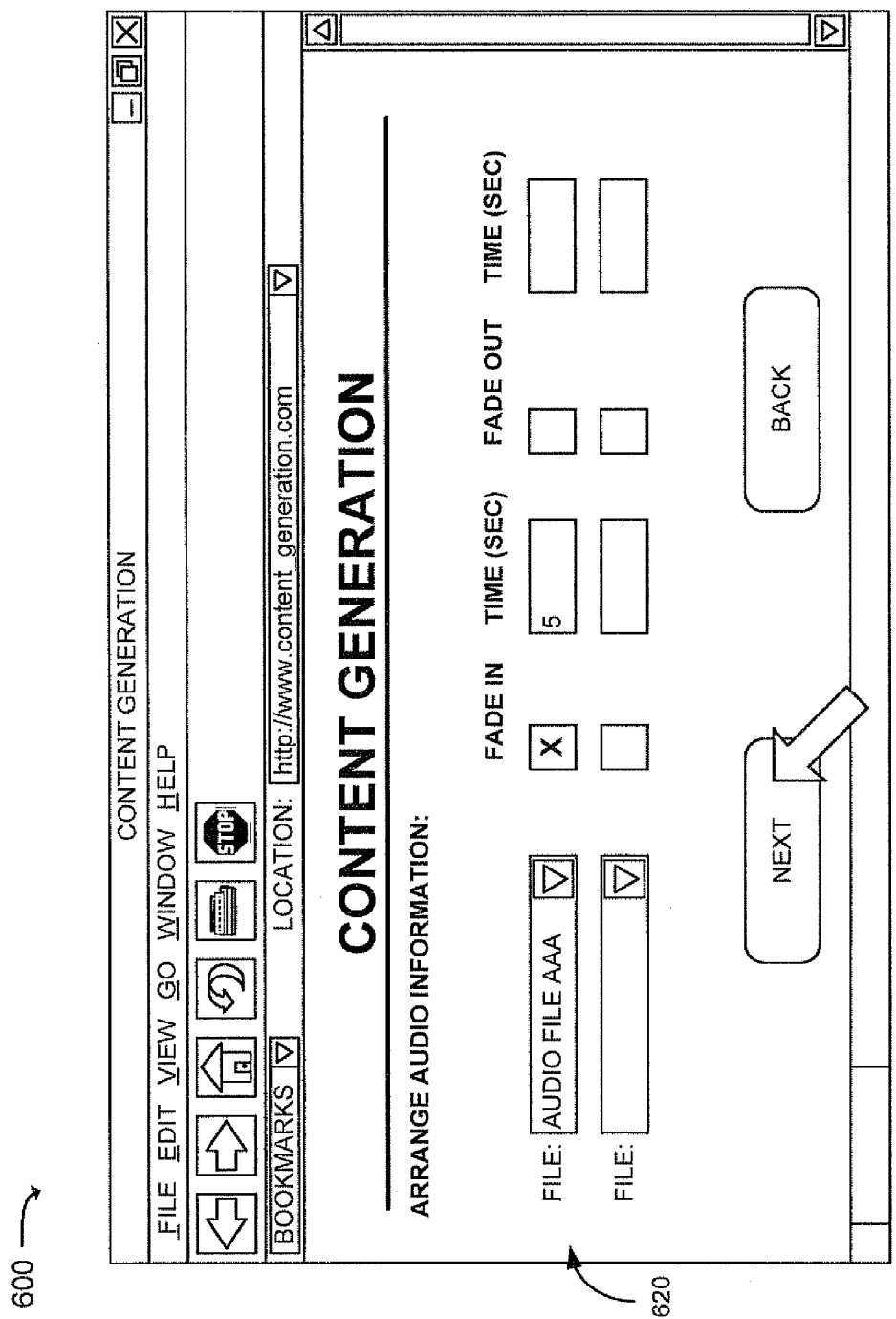

In response to selecting the NEXT button, multimedia portal 120 may provide a graphical user interface that allows the user to combine audio files AAA and BBB, to associate special effects with audio files AAA and BBB, etc. As illustrated in FIG. 6F, assume that multimedia portal 120 provides a graphical user interface 620 that allows the user to fade in or fade out audio file AAA and/or BBB. Assume that the user elects to fade in (or start up) audio file AAA (the voice message) after 5 seconds.

Figure 6G:
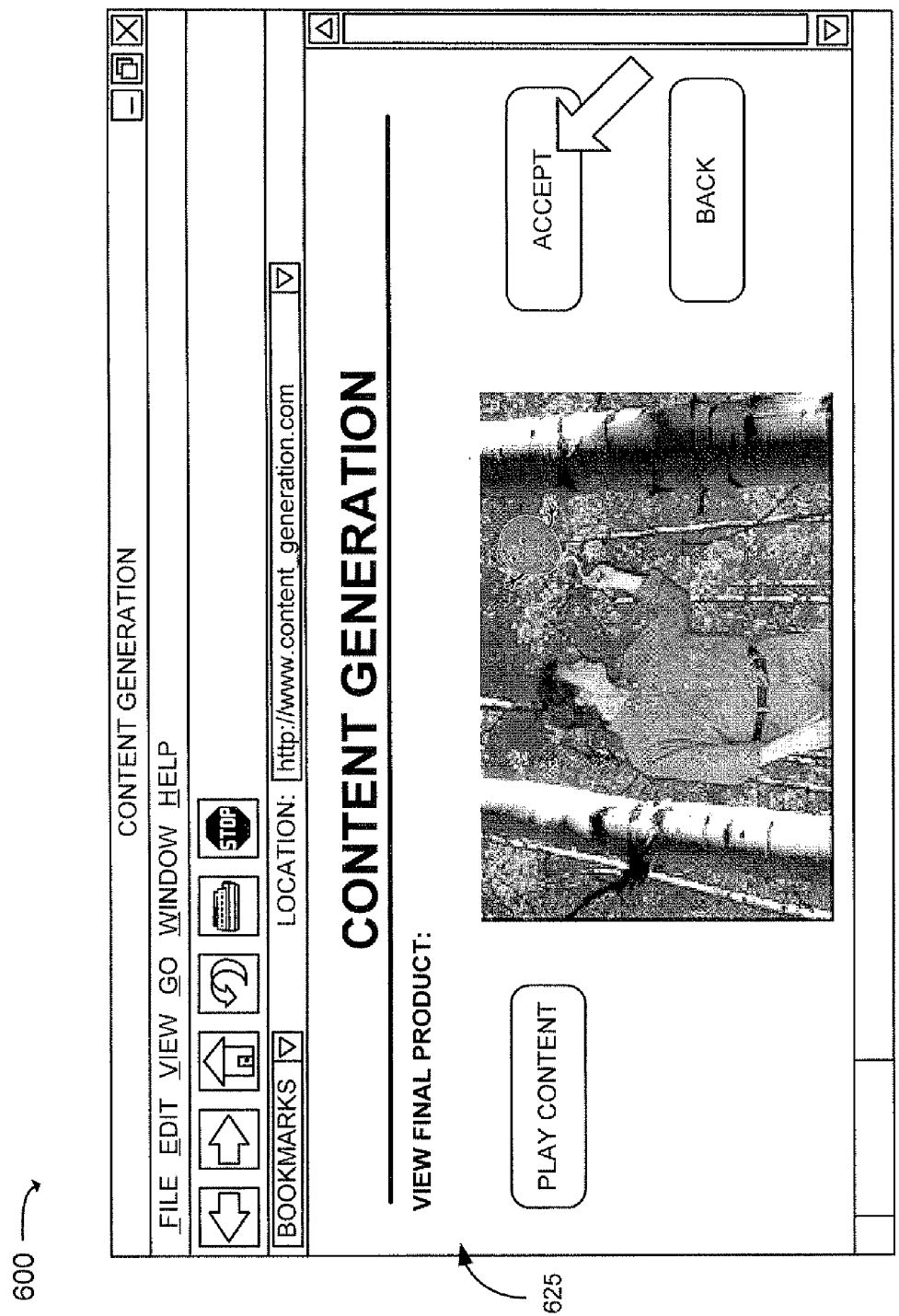
Figure 6H:
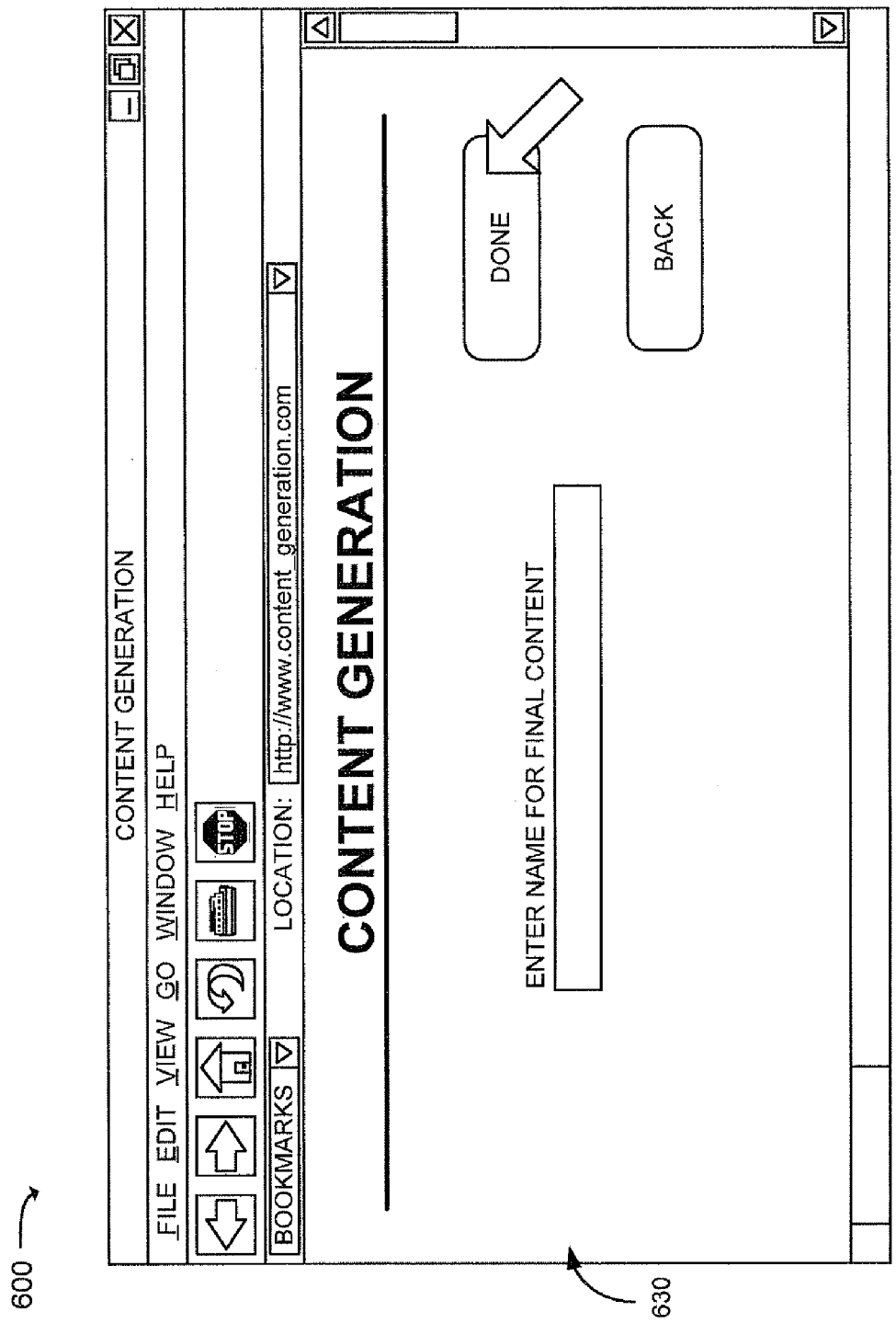

Upon selection of the NEXT button, multimedia portal 120 may provide a graphical user interface 625, as illustrated in FIG. 6G, that allows the user to view the final content product that would be provided to a user. For example, graphical user interface 625 may provide a PLAY CONTENT button that, when selected, renders the final content product to the user (both audibly and visually). If the user wants to make any changes to the final content product, the user may select the BACK button. If the user is satisfied with the final content product, the user may select the ACCEPT button. In response to selection of the ACCEPT button, multimedia portal 120 may save the final content product in, for example, a database, such as database 400. In one embodiment, multimedia portal 120 may further provide a graphical user interface 630 that allows the user to name the final content product, as illustrated in FIG. 6H. The name may be associated with the final content product in database 400 (e.g., in content identifier field 410).

Figure 7:
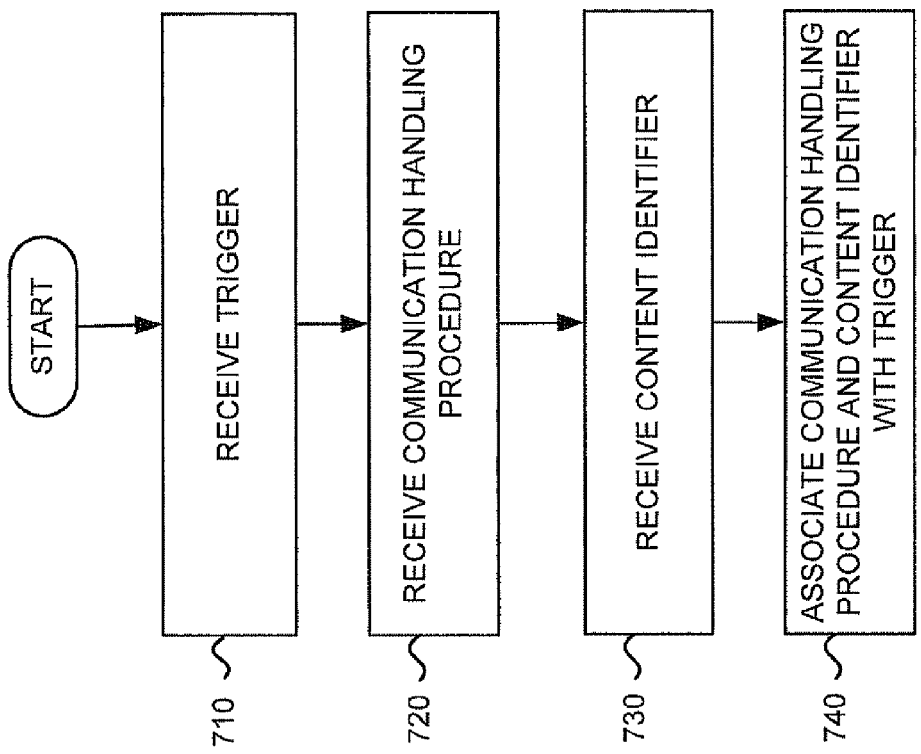
FIG. 7 is a flow chart of an exemplary process for associating triggers with communication handling procedures and final content products in exemplary embodiments.

FIG. 7 is a flow chart of an exemplary process for associating triggers with communication handling procedures and final content products in exemplary embodiments. In one embodiment, the exemplary process of FIG. 7 may be performed by multimedia portal 120. In another embodiment, some or all of the exemplary process described below may be performed by another device, such as user device 110, or combination of devices.

The exemplary process may begin with multimedia portal 120 receiving information identifying a trigger (block 710). In one embodiment, multimedia portal 120 (e.g., via personalization component 320) may provide a user with one or more graphical user interfaces that allow the user to specify the factors that define the trigger. As indicated above, the factors may include static and/or dynamic factors. For example, a user may define a trigger based on an identifier associated with an origination user (a user initiating a communication) (e.g., a name), an identifier associated with an origination device (e.g., an address associated with the origination device, such as a telephone number, a URI, an IP address, etc.), time of day, day of year, a number of times a particular origination user sends a communication to the user, the capabilities of an origination device, one or more external factors (e.g., a factor relating to a current weather condition, a factor relating to a stock, a group of stocks, the stock market, etc., a factor relating to a sports team or group of sports teams, and/or other types of factors), a priority code (or other input) that is provided by an origination user, etc.

Multimedia portal 120 may receive a communication handling procedure (block 720). In one embodiment, multimedia portal 120 (e.g., via personalization component 320) may provide a user with one or more graphical user interfaces that allow the user to specify an application for providing a particular final content product when a particular trigger is satisfied. The application may include a ringback application, a communication screening application, a content provisioning application for a voicemail and/or videomail service, a reminder application (such as a wakeup call), and/or other types of applications where content may be provided.

Multimedia portal 120 may receive information identifying a final content product (block 730). The final content product may include content that the user created, as described above with respect to FIGS. 5 and 6A-6H, that will be provided in the manner defined by the received communication handling procedure when the received trigger is satisfied. As indicated above, the final content product may include stored content and/or one or more links to dynamic content that is part of the final content product. Also, in some embodiments, the final content product may be generated in real time.

Multimedia portal 120 may associate the received communication handling procedure and the content identifier with the received trigger (block 740). For example, multimedia portal 120 may store the trigger, the communication handling procedure, and the content identifier in a database, such as database 450.

Figure 8A:
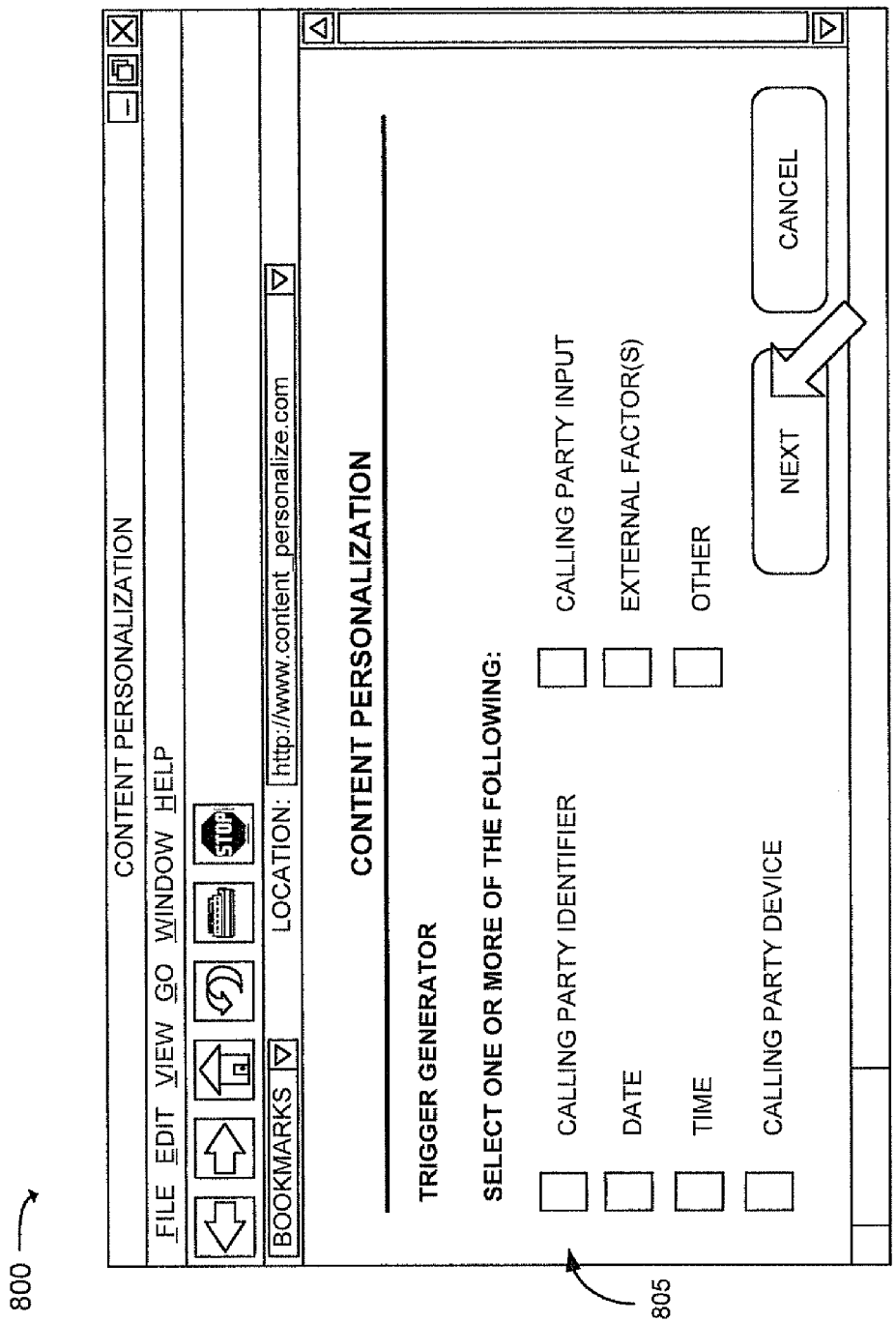

FIGS. 8A-8G provide an example 800 of graphical user interfaces that may be provided to a user in relation to defining a trigger as described above with respect to block 710 of FIG. 7. Assume that a user has accessed multimedia portal 120 to generate a trigger that is to define when a final content product is to be provided. Assume further that multimedia portal 120 has provided a graphical user interface 805 that allows the user to identify one or more factors on which the trigger will be based, as illustrated in FIG. 8A. Graphical user interface 805 may, for example, provide the following exemplary factors from which the user may select: a calling party (also referred to as an "origination user" herein) identifier factor, a date factor, a time factor, a calling party device (also referred to as an "origination device" herein) factor, a calling party input factor, external factors, and an other factor. The user may select one or more of these factors by selecting the box next to the factor. Other ways of indicating a desired factor may alternatively be used.

Assume that the user has selected the calling party identifier factor in FIG. 8A. In response, multimedia portal 120 may provide a graphical user interface 810 to the user, as illustrated in FIG. 8B. Graphical user interface 810 may allow the user to identify one or more calling party identifiers for the trigger. The calling party identifiers may include a name, a telephone number, a URI, an electronic mail address, an instant message address, and/or other types of identifiers. In one embodiment, the identifiers may include one or more wild card characters, such as an asterisk. In example 800, the user has entered the following calling party identifiers: 555-555-1234, MOM@SIP.COM, and 555-444-12**. Once the desired identifiers have been provided, the user may select the NEXT button. If the user decides not to provide a calling party identifier, the user may select the BACK button to return to graphical user interface 805.

Figure 8C:
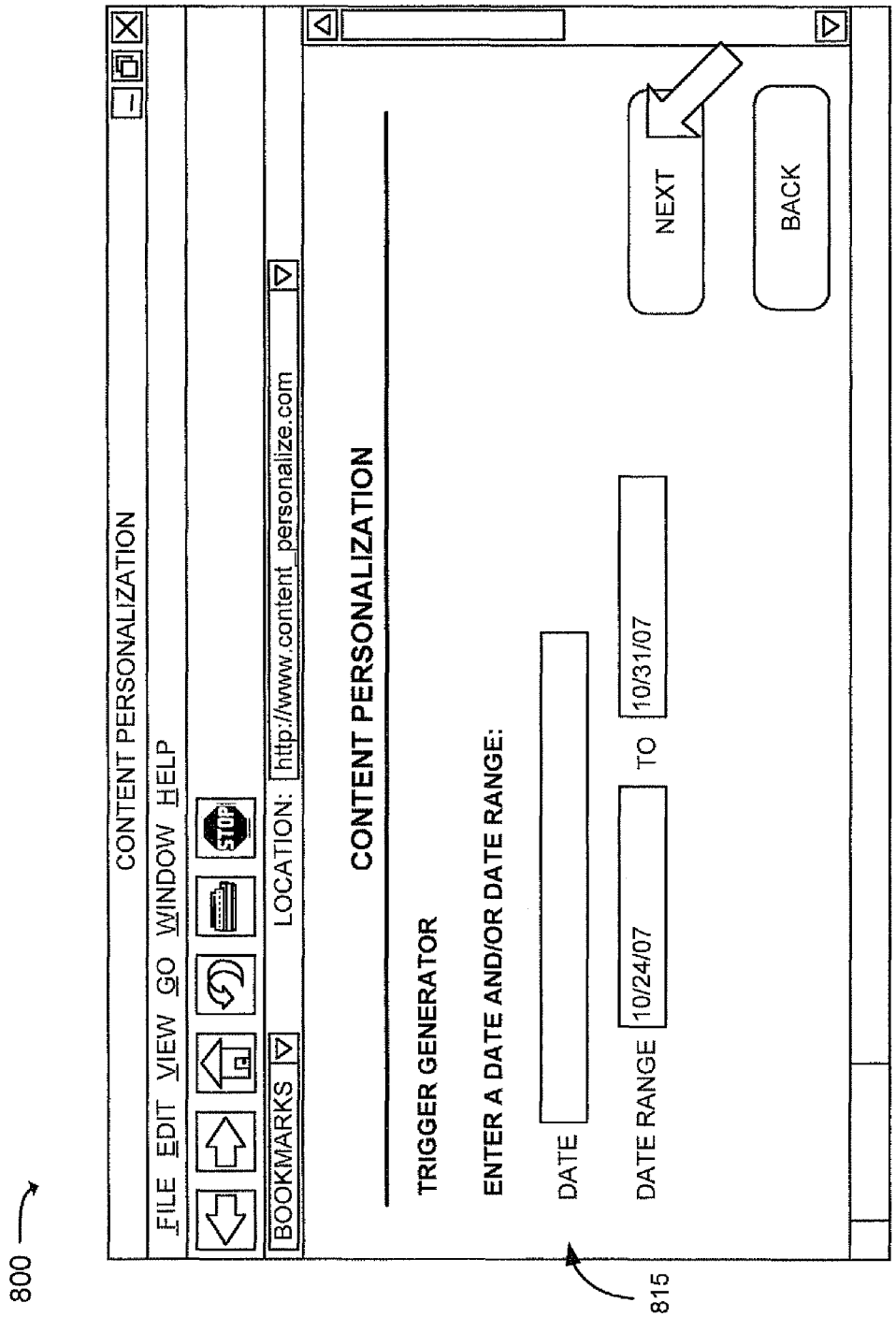

Returning to graphical user interface 805 (FIG. 8A), assume that the user has selected the date factor. In response, multimedia portal 120 may provide a graphical user interface 815 to the user, as illustrated in FIG. 8C. Graphical user interface 815 may allow the user to specify one or more dates and/or date ranges for the trigger. The user may specify the dates in any format. In one embodiment, the date or date range may include one or more wild card characters, such as an asterisk. For example, the user may use asterisks for a date (e.g., such as "10/24/****") to indicate that the trigger will be satisfied annually. In example 800, the user has entered a date range from Oct. 24, 2007 to Oct. 31, 2007. Once the desired date(s) and/or date range(s) have been provided, the user may select the NEXT button. If the user decides not to provide a date or date range, the user may select the BACK button to return to graphical user interface 805.

Figure 8D:
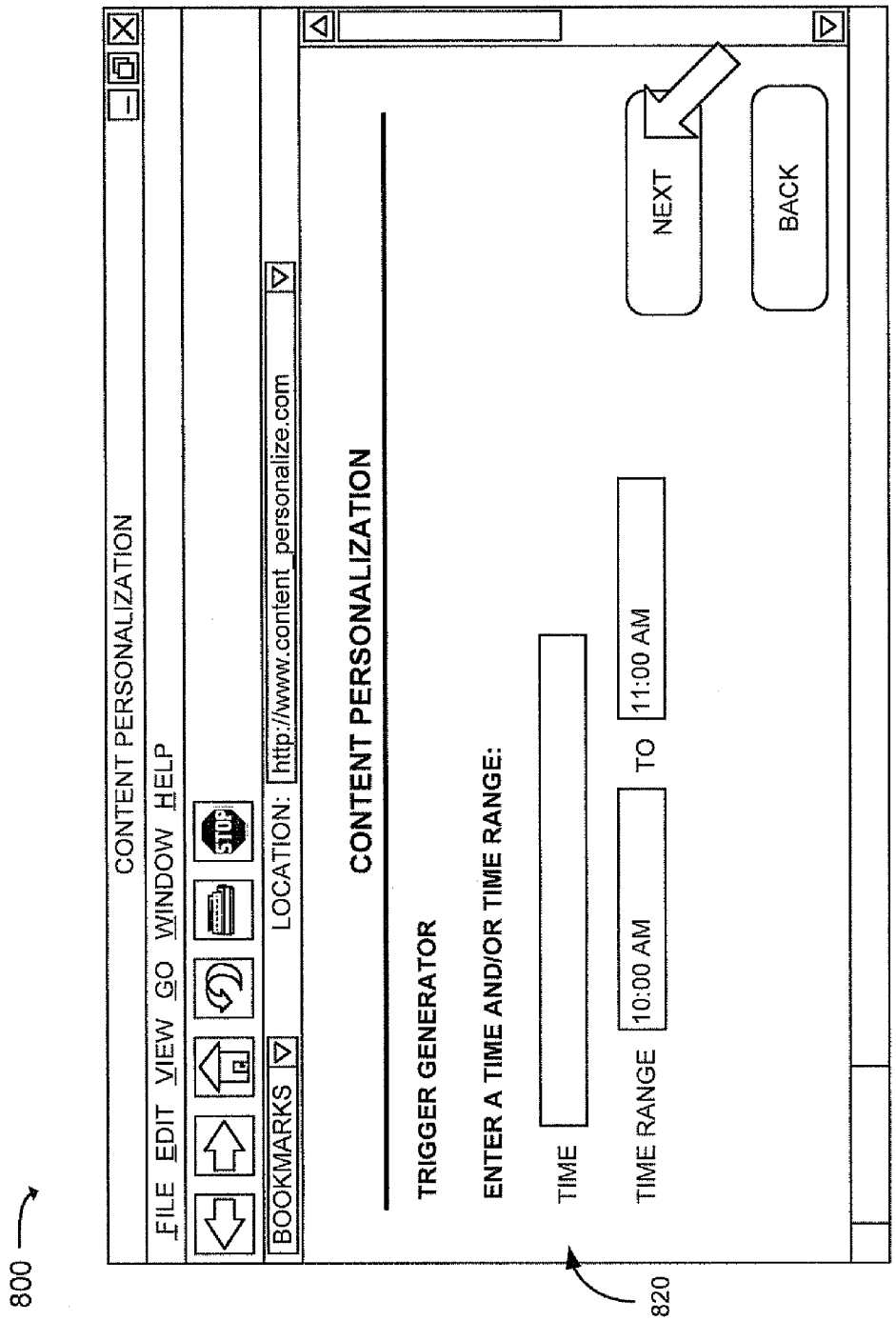

Returning to graphical user interface 805 (FIG. 8A), assume that the user has selected the time factor. In response, multimedia portal 120 may provide a graphical user interface 820 to the user, as illustrated in FIG. 8D. Graphical user interface 820 may allow the user to specify one or more times and/or time ranges for the trigger. The user may specify the times in any format. In one embodiment, the time or time range may include one or more wild card characters, such as an asterisk. In example 800, the user has entered a time range from 10:00 AM to 11:00 AM. Once the desired time(s) and/or time range(s) have been provided, the user may select the NEXT button. If the user decides not to provide a time or time range, the user may select the BACK button to return to graphical user interface 805.

Returning to graphical user interface 805 (FIG. 8A), assume that the user has selected the calling party device factor. In response, multimedia portal 120 may provide a graphical user interface 825 to the user, as illustrated in FIG. 8E. Graphical user interface 825 may allow the user to specify one or more types of calling party devices, based on the capabilities of the calling party devices. In example 800, graphical user interface 825 may provide the ability to select from among the following exemplary device types: a device with audio only capability, a device with video only capability, a device with audio and video capabilities, and a device with text only capability. Other types of calling party devices may also or alternatively be provided. Once a calling party device type has been selected, the user may select the NEXT button. If the user decides not to select a calling party device type, the user may select the BACK button to return to graphical user interface 805.

Figure 8F:
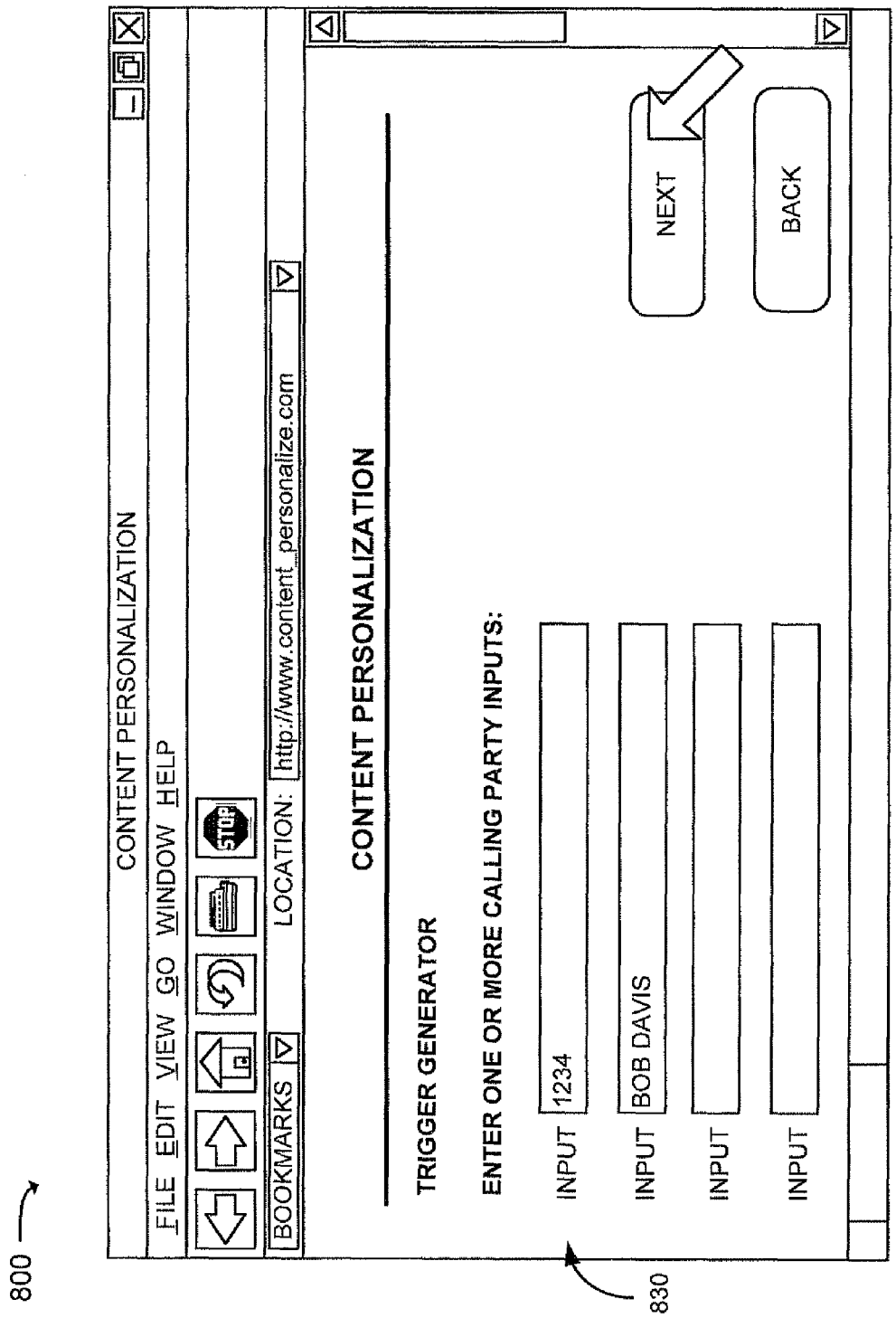

Returning to graphical user interface 805 (FIG. 8A), assume that the user has selected the calling party input factor. In response, multimedia portal 120 may provide a graphical user interface 830 to the user, as illustrated in FIG. 8F. Graphical user interface 830 may allow the user to specify one or more calling party inputs that may be received from a calling party. The inputs may include a code, such as a priority code, a name (e.g., provided by the user in response, for example, from a request by multimedia portal 120), and/or other types of information. In one embodiment, the date or date range may include one or more wild card characters, such as an asterisk. In example 800, the user has entered a priority code of "1234" and the name "BOB DAVIS." Once the desired calling party inputs have been provided, the user may select the NEXT button. If the user decides not to provide a calling party input, the user may select the BACK button to return to graphical user interface 805.

Figure 8G:
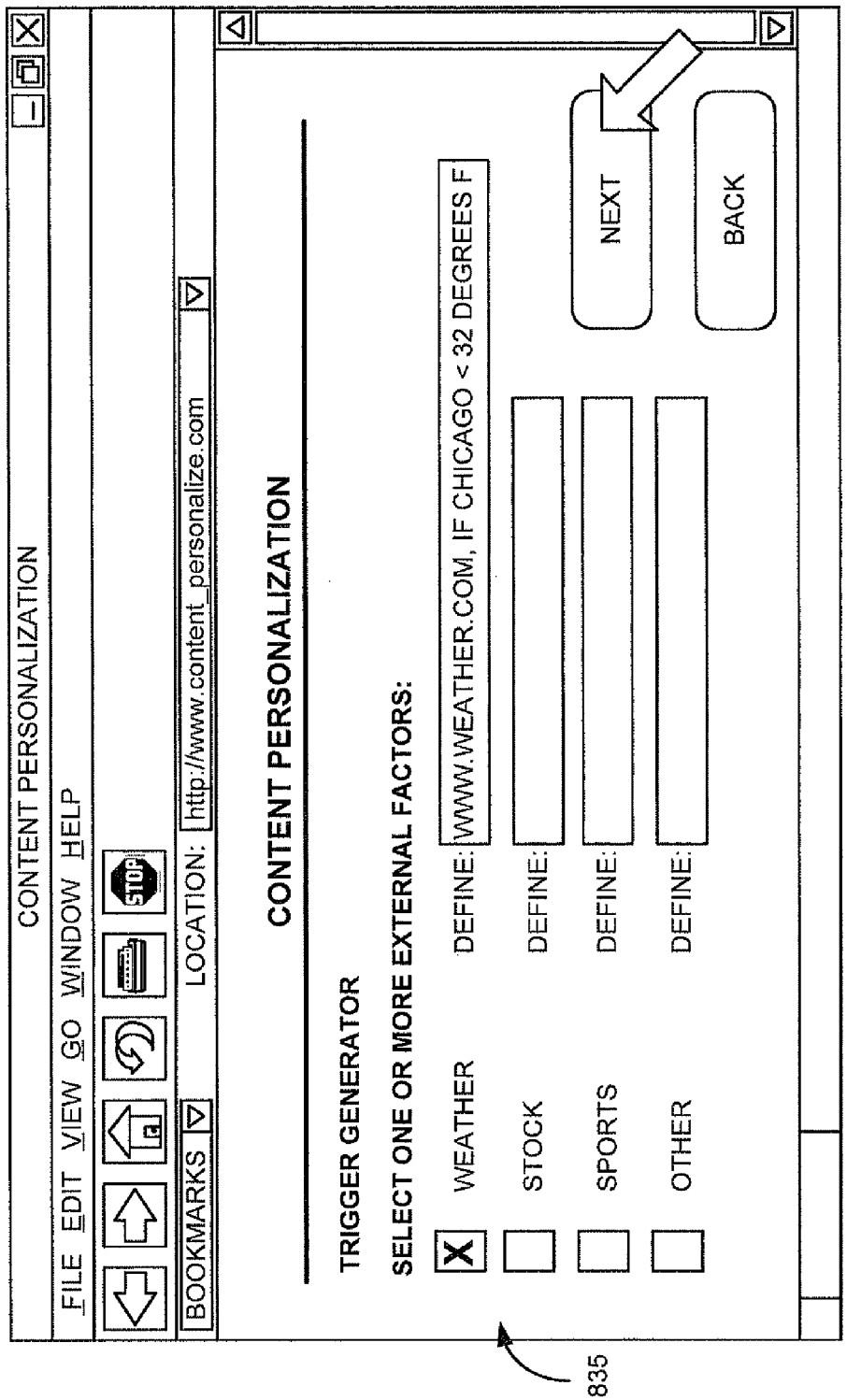

Returning to graphical user interface 805 (FIG. 8A), assume that the user has selected the external factors. In response, multimedia portal 120 may provide a graphical user interface 835 to the user, as illustrated in FIG. 8G. Graphical user interface 835 may allow the user to specify one or more external factors on which the trigger may be based. The external factors may include, for example, a factor relating to weather, finance (e.g., stock), sports, and/or other types of factors. Graphical user interface 835 may further allow the user to specify a location where the external factor should be analyzed and define the criterion (or criteria) for the external factor. If more than one external factor is selected, multimedia portal 120 may consider both factors in determining whether the trigger has been satisfied. In example 800, the user has selected the weather factor, identified a web site for the factor, and defined the criterion "IF CHICAGO<32 DEGREES F" for the factor. Thus, multimedia portal 120 may determine (e.g., in response to an event, such as an incoming communication) whether the weather in Chicago is below 32 degrees Fahrenheit. If the weather in Chicago is below 32 degrees Fahrenheit, multimedia portal 120 may determine that the trigger is satisfied. Once the desired external factors have been provided, the user may select the NEXT button. If the user decides not to provide an external factor, the user may select the BACK button to return to graphical user interface 805.

Once all of the factors have been defined for the trigger, multimedia portal 120 may allow the user to verify the factors and save the trigger.

Figure 9:
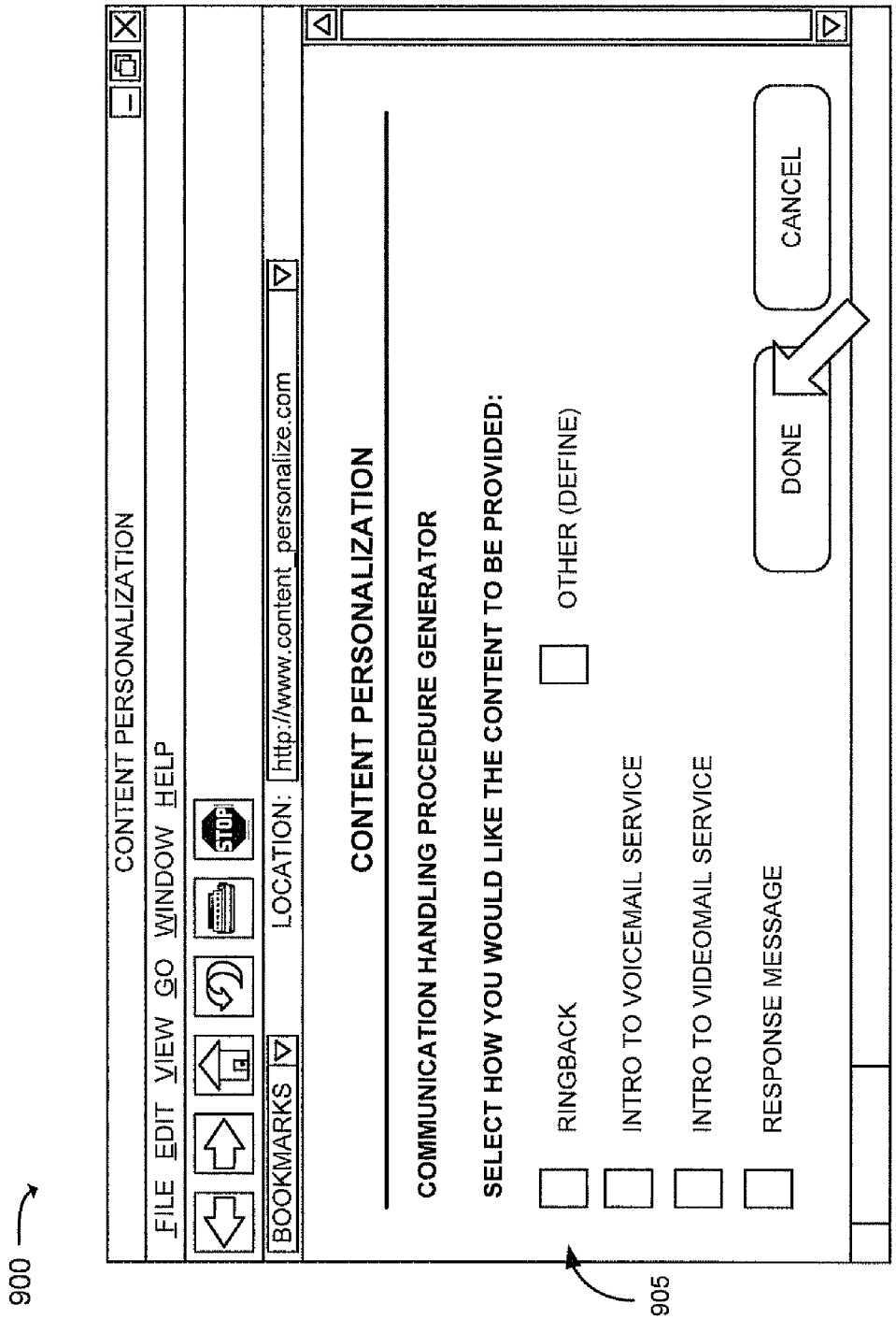
FIG. 9 is an exemplary graphical user interface that may allow a user to define a communication handling procedure according to an exemplary embodiment.

FIG. 9 provides an example 900 of a graphical user interface 905 that may be provided to a user in relation to defining a communication handing procedure, such as that described above with respect to block 720 of FIG. 7. Assume that a user has accessed multimedia portal 120 to generate a communication handling procedure that is to define how a final content product is to be provided. As illustrated, graphical user interface 905 may, for example, provide the following exemplary applications for providing content: a ringback application, an introduction to a voicemail service application, an introduction to a videomail service application, a response message application, and an other application (e.g., as a wake up message application, a video greeting card, and/or any other type of application in which content may be provided).

Figure 10:
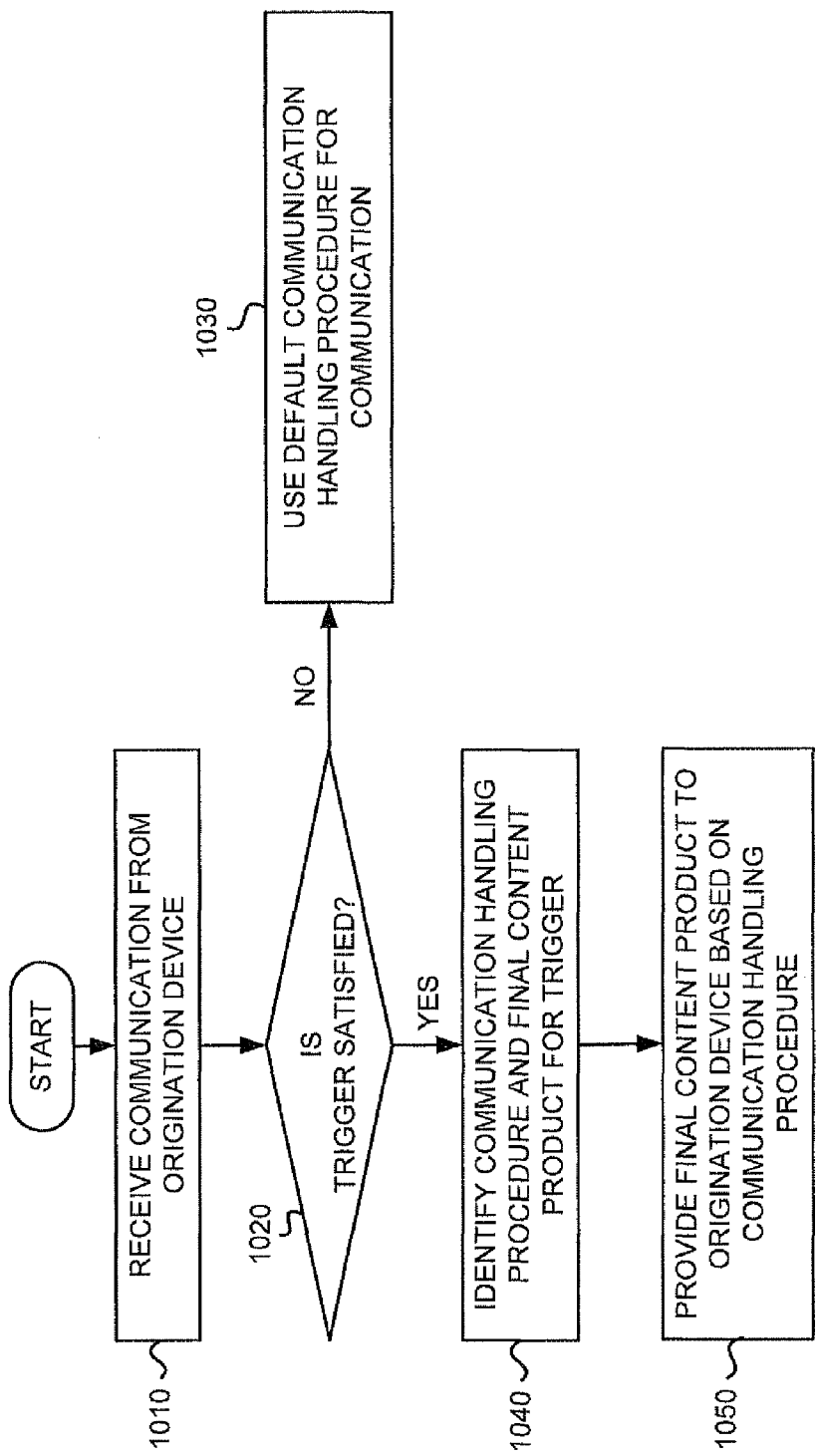
FIG. 10 is a flow chart of an exemplary process for providing multimedia content consistent with exemplary embodiments.

FIG. 10 is a flow chart of an exemplary process for processing a communication consistent with exemplary embodiments. In one embodiment, the exemplary process of FIG. 10 may be performed by multimedia portal 120. In another embodiment, some or all of the exemplary process described below may be performed by another device, such as user device 110, or combination of devices.

Assume that a destination user (e.g., a user to which a communication is destined) has created triggers, communication handling procedures, and final content products in the manner described above. The exemplary process may begin with multimedia portal 120 receiving a communication from an origination device to the destination user (block 1010). For example, multimedia portal 120 may receive a voice or video session establishment request, an instant message, a Short Message Service (SMS) message, an e-mail message, etc. for the destination user. Multimedia portal 120 may identify the destination user from the request/message by parsing the request/message to identify to whom the request/message is directed. Other techniques for obtaining an identifier for the destination user may alternatively be used. The identifier for the destination user may, for example, take the form of a telephone number, a URI, an instant message address, an e-mail address, and/or other forms of network addresses.

Multimedia portal 120 (or another system, e.g., an IMS) may determine whether a trigger associated with the destination user has been satisfied (block 1020). For example, multimedia portal 120 may analyze one or more factors to determine whether a trigger associated with the destination user has been satisfied. As indicated above, the triggers may be based on one more static and/or dynamic factors. For example, a trigger may be based on an identifier associated with an origination user (a user initiating a communication) (e.g., a name), an identifier associated with an origination device (e.g., an address associated with the origination device, such as a telephone number, a URI, an IP address, etc.), time of day, day of year, a number of times a particular origination user sends a communication to the user, the capabilities of an origination device, one or more external factors (e.g., a factor relating to a current weather condition, a factor relating to a stock, a group of stocks, the stock market, etc., a factor relating to a sports team or group of sports teams, and/or other types of factors), a priority code (or other input) that is provided by an origination user, etc. Thus, multimedia portal 120 may analyze the appropriate factor(s) for each trigger to determine whether the trigger has been satisfied. If multimedia portal 120 determines that more than one trigger is satisfied, multimedia portal 120 may give priority to one trigger over another based, for example, on priority information given to the triggers by the destination user.

If multimedia portal 120 determines that no trigger is satisfied (block 1020—NO), multimedia portal 120 may use a default communication handling procedure for handling the communication (block 1030). The default communication handling procedure may be defined by the destination user and may include providing a particular final content product to the origination user in a particular manner (e.g., as an introduction to a voicemail service).

If, on the other hand, multimedia portal 120 determines that a trigger is satisfied (block 1020—YES), multimedia portal 120 may identify a communication handling procedure and final content product associated with the trigger (block 1040). In one embodiment, multimedia portal 120 may identify (e.g., via a lookup operation) the communication handling procedure and final content product from a database, such as database 450.

Multimedia portal 120 may provide the identified final content product to the origination device based on the communication handling procedure (block 1050). As indicated above, multimedia portal 120 may, in one embodiment, dynamically retrieve content in the final content product for providing to the origination user and/or may generate the final content product in real time for providing to the origination user.

Figure 11:
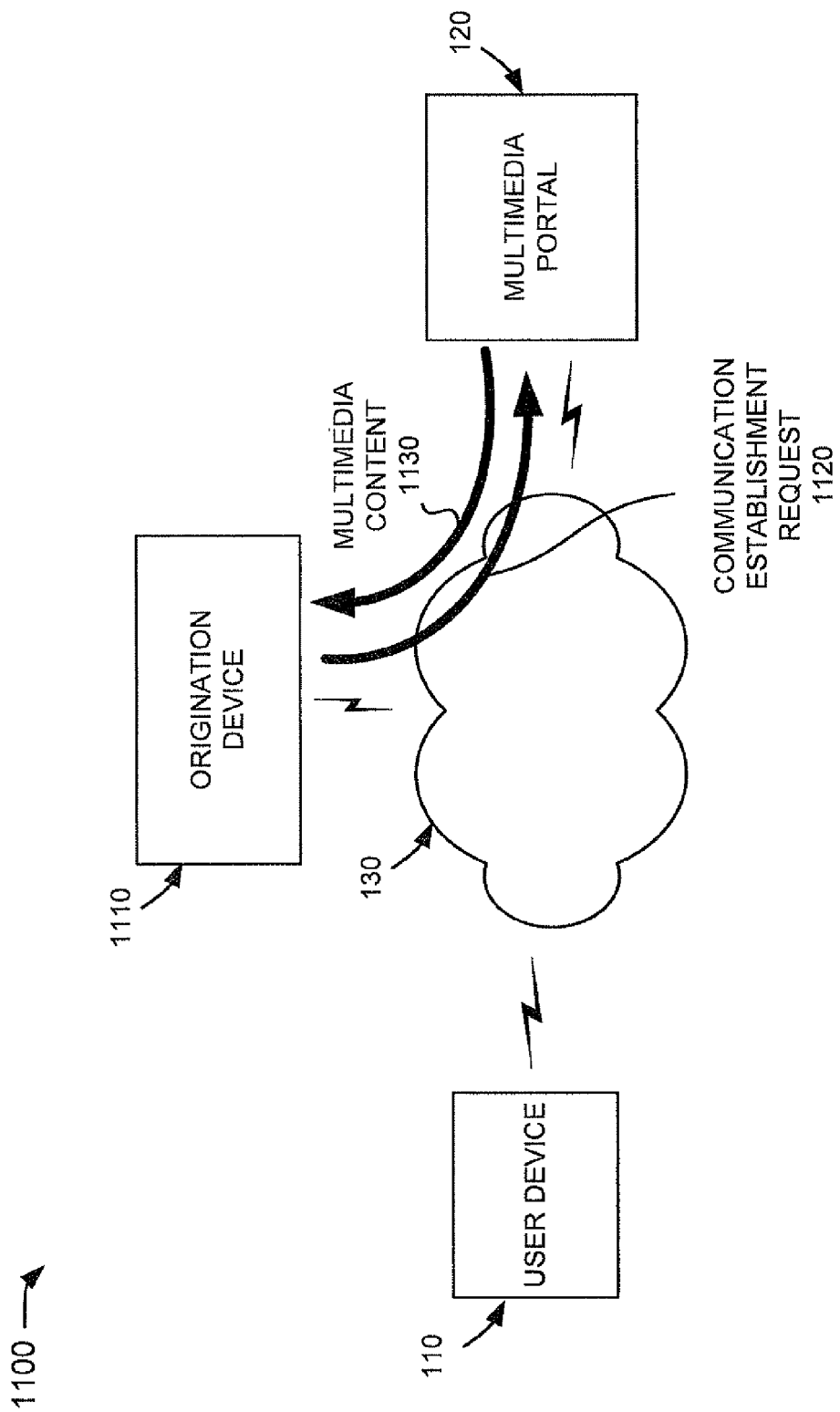
FIG. 11 illustrates an example of the exemplary process of FIG. 10 according to an exemplary embodiment.

The following example 1100 of FIG. 11 illustrates the process described above with respect to FIG. 10. Assume, for example 1100, that a destination user associated with user device 110 has interacted with multimedia portal 120 to create multimedia content (which includes an image of the destination user and a voice message created by the destination user indicating that the destination user is out of town) and has specified that the multimedia content is to be provided as an introduction to a videomail service for any incoming video call requests received on Oct. 31, 2007. Assume that an origination user at an origination device 1110 attempts to place a video call to the destination user on Oct. 31, 2007. As such, the origination user may cause origination device 1110 to transmit a communication establishment request 1120.

Assume that multimedia portal 120 receives communication establishment request 1120 for the destination user, as illustrated in FIG. 11. Multimedia portal 120 may determine, in response to receiving communication establishment request 1120, whether a trigger set by the destination user has been satisfied. Multimedia portal 120 may determine that communication establishment request 1120 satisfies the trigger since communication establishment request 1120 is a video call request received on Oct. 31, 2007. Multimedia portal 120 may retrieve multimedia content 1130 and provide multimedia content 1130 to origination device 1110 as an introduction to a videomail service associated with the destination user.

Embodiments described herein provide a multimedia portal that allows users to generate content, aggregate content of the same or different media (possibly in real time), and deliver the aggregated content in accordance with a user's instructions.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 7, and 10, the order of the blocks may be varied in other embodiments. Moreover, non-dependent blocks may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   combining, by a device, first content and second content based on first information received from a first user,
      the first information indicating how the first content and the second content are to be combined to form multimedia content;
   receiving, by the device and from the first user, second information identifying a trigger;
   receiving, by the device and from the first user, third information defining how content is to be provided based on receiving communications intended for the first user;
   receiving, by the device and from another device of a second user, a communication intended for the first user,
      the communication being received after receiving the first information, the second information, and the third information;
   determining, by the device, whether the trigger is satisfied, based on receiving the communication and based on the second information; and
   providing, by the device, the multimedia content to the other device of the second user, based on the third information and when the trigger is satisfied.

2. The method of claim 1, where a type of the second content is different than a type of the first content.

3. The method of claim 1, where the communication includes at least one of a request to establish a video session with the first user or an electronic mail message intended for the first user, and
   where providing the multimedia content to the other device of the second user based on the third information includes providing the multimedia content as at least one of:
      an introduction to a videomail system when the communication includes the request to establish the video session, or
      a response to the electronic mail message when the communication includes the electronic mail message.

4. The method of claim 1, where the trigger is independent of communications that are intended for the first user, and
   where the trigger includes at least one of:
      information associated with a current weather condition,
      information associated with a stock market, or
      information associated with sports.

5. The method of claim 1, where the first content and the second content are combined to form the multimedia content when the trigger is satisfied.

6. The method of claim 1, where the communication includes a request to establish a voice session with the first user, and
   where providing the multimedia content to the other device of the second user based on the third information includes providing the multimedia content as an introduction to a voicemail system associated with the voice session.

7. The method of claim 1, where receiving the second information identifying the trigger includes at least one of:
   receiving information identifying a capability of another device from which communications, intended for the first user, are received, or
   receiving information identifying the second user.

8. A non-transitory computer-readable medium storing instructions, the instructions comprising:
   one or more instructions which, when executed by one or more processors of a device, cause the one or more processors to receive, from a first user, first information that indicates how first content and second content are to be combined to form multimedia content;
   one or more instructions which, when executed by the one or more processors, cause the one or more processors to receive, from the first user, second information that identifies a trigger;
   one or more instructions which, when executed by the one or more processors, cause the one or more processors to receive, from the first user, third information that defines how content is to be provided based on receiving communications intended for the first user;
   one or more instructions which, when executed by the one or more processors, cause the one or more processors to receive, from another device of a second user, a communication intended for the first user,
      the communication being received after the first information, the second information, and the third information are received;
   one or more instructions which, when executed by the one or more processors, cause the one or more processors to determine, based on receiving the communication and based on the second information, whether the trigger is satisfied;
   one or more instructions which, when executed by the one or more processors, cause the one or more processors to combine, based on the first information, the first content and the second content to form the multimedia content when the trigger is satisfied; and
   one or more instructions which, when executed by the one or more processors, cause the one or more processors to provide the multimedia content to the other device of the second user, based on the third information and when the trigger is satisfied.

9. The non-transitory computer-readable medium of claim 8, the instructions further comprising:
   one or more instructions to store the first information, the second information, and the third information in a memory; and
   one or more instructions to identify, based on the second information and in the memory, the first information and the third information when the trigger is satisfied.

10. The non-transitory computer-readable medium of claim 8, where the first content includes one of:
   a voice message
   a music file,
   an image file,
   a video file, or
   a text message, and
   where a type of the first content is different than a type of the second content.

11. The non-transitory computer-readable medium of claim 8, where the one or more instructions to receive the second information identifying the trigger include:
  one or more instructions to receive, from the first user, information identifying a plurality of triggers,
    the plurality of triggers including the trigger, and
  where the one or more instructions to determine whether the trigger is satisfied include:
    one or more instructions to determine that each of the plurality of triggers is satisfied,
      where the first content and the second content are combined to form the multimedia content based on determining that the trigger is satisfied,
        the trigger being associated with a priority that is higher than a priority associated with another trigger of the plurality of triggers.

12. The non-transitory computer-readable medium of claim 8, where the one or more instructions to combine the first content and the second content include:
  one or more instructions to receive, from the first user, information identifying a special effect;
  one or more instructions to add the special effect to the first content; and
  one or more instructions to combine the first content and the special effect with at least a portion of the second content to form the multimedia content.

13. The non-transitory computer-readable medium of claim 8, where the one or more instructions to receive the third information include:
  one or more instructions to receive, from the user, information identifying a communication screening application, and
  where the one or more instructions to provide the multimedia content include:
    one or more instructions to process the communication based on the communication screening application.

14. The non-transitory computer-readable medium of claim 8, where the communication includes at least one of a request to establish a video session with the first user or an electronic mail message intended for the first user, and
  where the one or more instructions to provide the multimedia content include one or more instructions to provide the multimedia content as at least one of:
    an introduction to a videomail system when the communication includes the request to establish the video session, or
    a response to the electronic mail message when the communication includes the electronic mail message.

15. The non-transitory computer-readable medium of claim 8, the instructions further comprising:
  one or more instructions to provide a plurality of different web-based interfaces,
  where the first information, the second information, and the third information are received via the plurality of different web-based interfaces.

16. A device comprising:
  a processor to execute instructions, stored in a memory of the device, to:
    receive, from a first user, first information indicating how first content and second content is to be combined to form multimedia content;
    receive, from the first user, second information defining how content is to be provided based on receiving communications intended for the first user;
    receive, from another device of a second user, a communication intended for the first user,
      the communication being received after the first information and the second information are received;
    identify, after receiving the communication from the other device of the second user, the first information and the second information when a trigger is satisfied;
    combine the first content and the second content, based on the identified first information, to form the multimedia content when the trigger is satisfied; and
    provide, based on the identified second information, the multimedia content to the second user when the trigger is satisfied.

17. The device of claim 16, where the processor is further to:
  receive, from the first user, third information identifying the trigger; and
  store, in the memory, the first information, the second information, and the third information,
    where the third information is associated with the first information and the second information in the memory, and
    where, when identifying the first information and the second information, the processor is to identity the first information and the second information, in the memory, based on the third information.

18. The device of claim 16, where the processor is further to:
  receive, via a first web-interface and from the first user, information identifying the first content; and
  receive, via a second web-interface and from the first user, information identifying the second content,
  where the multimedia content is formed based on the information identifying the first content and the information identifying the second content.

19. The device of claim 16, where the processor is further to:
  receive, from the first user, third information identifying the trigger,
    the third information including:
      information associated with a current weather condition, or
      information identifying a capability of another device from which one or more communications, intended for the first user, are received.

20. The device of claim 16, where a type of the first content is different than a type of the second content, and
  where the second content includes one of:
    a voice message
    a music file, or
    a text message.

* * * * *